(12) United States Patent
Shaffer et al.

(10) Patent No.: US 7,636,339 B2
(45) Date of Patent: *Dec. 22, 2009

(54) METHOD AND SYSTEM FOR AUTOMATIC CONFIGURATION OF VIRTUAL TALK GROUPS BASED ON LOCATION OF MEDIA SOURCES

(75) Inventors: Shmuel Shaffer, Palo Alto, CA (US); Shah Talukder, Los Gatos, CA (US); Kittur V. Nagesh, Saratoga, CA (US); Douglas J. Hall, Westerville, OH (US); Larry R. Metzger, Wake Forest, NC (US); Yogesh Kalley, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 11/201,832

(22) Filed: Aug. 10, 2005

(65) Prior Publication Data

US 2007/0036118 A1 Feb. 15, 2007

(51) Int. Cl.
*H04W 4/00* (2006.01)
*H04B 7/00* (2006.01)

(52) U.S. Cl. .................... 370/338; 370/395.5; 455/519; 455/456.1

(58) Field of Classification Search ......... 455/517–519, 455/456.1, 456.3, 520; 370/338, 352, 395.5, 370/395.52, 401
See application file for complete search history.

(56) References Cited

U.S. PATENT DOCUMENTS 4,359,603 A  11/1982  Heaton ..................... 370/267

4,730,306 A  3/1988  Uchida ..................... 370/263

(Continued)

FOREIGN PATENT DOCUMENTS

WO   WO 01/91485   11/2001

(Continued)

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US06/30447, dated Feb. 27, 2007, 20 pages.

(Continued)

*Primary Examiner*—Quochien B Vuong
(74) *Attorney, Agent, or Firm*—Baker Botts L.L.P.

(57) ABSTRACT

A method for automatic configuration of virtual talk groups based on location of media source includes monitoring communications from a plurality of mobile endpoints. Each communication comprises a media message and location information identifying a location of its transmitting endpoint. The method includes selecting a first group of mobile endpoints of the plurality of endpoints according to virtual talk group configuration instructions based on the locations of the mobile endpoints. The method also includes configuring a first virtual talk group comprising the first group of mobile endpoints to facilitate communications among the first group of mobile endpoints. The first group of mobile endpoints comprises mobile endpoints of different communication networks.

38 Claims, 6 Drawing Sheets

U.S. PATENT DOCUMENTS

| | | | |
|---|---|---|---|
| 5,048,082 A | 9/1991 | Krafft et al. | 379/406.07 |
| 5,099,510 A | 3/1992 | Blinken et al. | 379/202.01 |
| 5,436,896 A | 7/1995 | Anderson et al. | 370/260 |
| 5,539,741 A | 7/1996 | Barraclough et al. | 370/267 |
| 5,625,407 A | 4/1997 | Biggs et al. | 348/14.11 |
| 6,011,851 A | 1/2000 | O'Connor et al. | 381/17 |
| 6,094,578 A | 7/2000 | Purcell et al. | 455/426 |
| 6,178,237 B1 | 1/2001 | Horn | 379/202.01 |
| 6,185,205 B1 | 2/2001 | Sharrit et al. | 370/389 |
| 6,204,844 B1 | 3/2001 | Fumarolo et al. | 345/329 |
| 6,233,315 B1 | 5/2001 | Reformato et al. | 379/88.01 |
| 6,327,567 B1 | 12/2001 | Willehadson et al. | 704/270 |
| 6,374,100 B1 | 4/2002 | Smith et al. | 455/419 |
| 6,400,816 B1 | 6/2002 | Hjalmtysson et al. | 379/201 |
| 6,404,873 B1 | 6/2002 | Beyda et al. | 379/202.01 |
| 6,408,327 B1 | 6/2002 | McClennon et al. | 709/204 |
| 6,418,214 B1 | 7/2002 | Smythe et al. | 379/202.01 |
| 6,453,022 B1 | 9/2002 | Weinman, Jr. | 379/88.13 |
| 6,501,739 B1 | 12/2002 | Cohen | 370/260 |
| 6,608,820 B1 | 8/2003 | Bradshaw, Jr. | 370/260 |
| 6,792,092 B1 | 9/2004 | Michalewicz | 379/202 |
| 6,850,496 B1 | 2/2005 | Knappe et al. | 370/260 |
| 6,873,854 B2 | 3/2005 | Crockett et al. | 455/518 |
| 6,882,856 B1 | 4/2005 | Alterman et al. | 455/519 |
| 6,885,874 B2 | 4/2005 | Grube et al. | 455/520 |
| 6,912,389 B2 | 6/2005 | Bright et al. | 455/433 |
| 6,982,965 B2 | 1/2006 | Refai et al. | 370/265 |
| 6,987,480 B1 | 1/2006 | Kotick et al. | 342/41 |
| 6,987,841 B1 | 1/2006 | Byers et al. | 379/88.17 |
| 6,993,120 B2 | 1/2006 | Brown et al. | 379/88.13 |
| 6,996,406 B2 | 2/2006 | Lection et al. | 455/457 |
| 6,999,782 B2 | 2/2006 | Shaughnessy et al. | 455/518 |
| 6,999,783 B2 | 2/2006 | Toyryla et al. | 455/519 |
| 7,003,286 B2 | 2/2006 | Brown et al. | 455/416 |
| 7,006,607 B2 | 2/2006 | Garcia | 379/88.18 |
| 7,010,106 B2 | 3/2006 | Gritzer et al. | 379/202.01 |
| 7,010,109 B2 | 3/2006 | Gritzer et al. | 379/202.01 |
| 7,010,275 B2 | 3/2006 | Davies | 455/90.2 |
| 7,013,279 B1 | 3/2006 | Nelson | 704/270 |
| 7,031,700 B1 | 4/2006 | Weaver et al. | 455/420 |
| 7,035,385 B2 | 4/2006 | Levine et al. | 379/88.23 |
| 7,058,168 B1 | 6/2006 | Knappe et al. | 379/204.01 |
| 7,079,857 B2 | 7/2006 | Maggenti et al. | 455/518 |
| 2001/0028321 A1 | 10/2001 | Krasner | 342/357.1 |
| 2002/0013813 A1 | 1/2002 | Matsuoka | 709/204 |
| 2002/0118796 A1 | 8/2002 | Menard et al. | 379/45 |
| 2002/0152305 A1 | 10/2002 | Jackson et al. | 709/224 |
| 2002/0178364 A1 | 11/2002 | Weiss | 713/182 |
| 2003/0100326 A1* | 5/2003 | Grube et al. | 455/515 |
| 2004/0054428 A1 | 3/2004 | Sheha et al. | 700/56 |
| 2004/0070515 A1 | 4/2004 | Burkley et al. | 340/825.49 |
| 2004/0139320 A1 | 7/2004 | Shinohara | 713/168 |
| 2004/0160458 A1 | 8/2004 | Igarashi et al. | 345/660 |
| 2004/0185863 A1 | 9/2004 | Ogami | 455/452.1 |
| 2004/0192353 A1 | 9/2004 | Mason et al. | 455/457 |
| 2004/0249949 A1* | 12/2004 | Gourraud et al. | 709/227 |
| 2005/0135348 A1* | 6/2005 | Staack | 370/353 |
| 2005/0174991 A1 | 8/2005 | Keagy | 370/352 |
| 2005/0195774 A1 | 9/2005 | Chennikara et al. | 370/338 |
| 2005/0232207 A1 | 10/2005 | Antoniadis et al. | 370/338 |
| 2005/0265256 A1 | 12/2005 | Delaney | 370/254 |
| 2006/0114847 A1 | 6/2006 | Dssouli et al. | 370/261 |
| 2006/0118636 A1 | 6/2006 | Miles et al. | 235/472 |
| 2006/0165060 A1 | 7/2006 | Dua | 370/352 |
| 2006/0281471 A1* | 12/2006 | Shaffer et al. | 455/456.2 |
| 2007/0030144 A1 | 2/2007 | Titus et al. | 340/534 |
| 2007/0047479 A1 | 3/2007 | Shaffer et al. | 370/328 |
| 2007/0060144 A1 | 3/2007 | Mills et al. | 455/445 |
| 2007/0104121 A1 | 5/2007 | Shaffer et al. | 370/276 |
| 2007/0105578 A1 | 5/2007 | Shaffer et al. | 455/518 |
| 2007/0105579 A1 | 5/2007 | Shaffer et al. | 455/519 |
| 2007/0115848 A1 | 5/2007 | Chean et al. | 370/252 |
| 2008/0037461 A1 | 2/2008 | Biltz et al. | 370/328 |
| 2008/0167049 A1 | 7/2008 | Karr et al. | 455/456.2 |

FOREIGN PATENT DOCUMENTS

| | | |
|---|---|---|
| WO | WO 02/074051 | 9/2002 |

OTHER PUBLICATIONS

ACU-1000™ Interoperability NOW™, Information Sheet, Raytheon JPS Communications, http://www.jps.com/downloads/PDFS/acuupgrade.pdf, 4 pages, 2003.

Interoperability Gateway, OpenSky, NetworkFirst, P25$^{IP}$, Data Sheet, M/A-COM, Inc. ECR-7054, http://www.opensky.com/network/7054.pdf, 2 pages, 2003.

C3 Maestro$^{IP}$ Dispatch Console, OpenSky, NetworkFirst, P25$^{IP}$, Data Sheet, M/A-Com, Inc. ECR-7160A, http://www.opensky.com/network/7160.pdf, 2 pages, 2003.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages, 2003.

J. Polk, et al., Dynamic Host Configuration Protocol Option for Coordinate-based Location Configuration Information, Network Working Group, Internet RFC 3825, Category: Standards Track, The Internet Society, 15 pages, Jul. 2004.

OnStar Technology, Information Sheet, OnStar Corp., http://www.onstar.com/us_english/jsp/explore/onstar_basics/technology.jsp, 3 pages, 2005.

U.S. Appl. No. 11/149,041 entitled, *"Method and System for Communicating Using Position Information"*, 39 pages specification, claims and abstract, 3 pages of drawings, inventors Shmuel (nmi) Shaffer, et al., Jun. 8, 2005.

Patent Application entitled, *"Method and System for Communicating Media Based on Location of Media Source"*, 66 pages specification, claims and abstract, 6 pages of drawings, inventors Shmuel (nmi) Shaffer, et al., Aug. 10, 2005.

Patent Application entitled, *"Method and System for Providing Interoperable Communications with Location Information"*, 66 pages specification, claims and abstract, 6 pages of drawings, inventors Shmuel (nmi) Shaffer, et al., Aug. 10, 2005.

PCT Notification of Transmittal of the International Search Report and the Written Opinion of the International Searching Authority, or the Declaration, mailed Apr. 9, 2007, corresponding to PCT/US06/30294 filed Aug. 2, 2006 (20 pages).

Cisco IP Interoperability and Collaboration System, Q&A, Copyright © Cisco Systems, Inc. www.cisco.com, 4 pages, 2005.

Cisco IPICS, Solution Overview, Copyright © Cisco Systems, Inc., www.cisco.com/go/ipics, 6 pages, 2005.

Matthews, et al., A New Interoperability Paradigm A Concept Proposal, Mar. 2006, *Worcester Polytechnic Institute, WPI Bioengineering Institute* (Mar. 2006), 15 pages.

Shaffer, et al., U.S. Appl. No. 11/214,582, filed Aug. 29, 2005, *Method and System for Conveying Source Location Information*.

Shaffer, et al., U.S. Appl. No. 11/364,146, filed Feb. 27, 2006, *Method and System for Providing Interoperable Communication with Congestion Management*.

Shaffer, et al., U.S. Appl. No. 11/365,113, filed Feb. 28, 2006, *Method and System for Providing Interoperable Communication with Dynamic Event Area Allocation*.

Shaffer, et al., U.S. Appl. No. 11/399,031, filed Apr. 5, 2006, *Method and System for Managing Virtual Talk Groups*.

Shaffer, et al., U.S. Appl. No. 11/382,496, filed May 10, 2006, *Providing Multiple Virtual Talk Group Communication Sessions*.

Kalley, et al., U.S. Appl. No. 11/383,998, filed May 18, 2006, *Providing Virtual Talk Group Communication Sessions in Accordance with Endpoint Resources*.

Shaffer, et al., U.S. Appl. No. 11/421,994, filed Jun. 2, 2006, *Method and System for Joining a Virtual Talk Group*.

Shaffer, et al., U.S. Appl. No. 11/421,999, filed Jun. 2, 2006, *Method and System for Managing a Plurality of Virtual Talk Groups*.

Shaffer, et al., U.S. Appl. No. 11/617,019, filed Dec. 28, 2006, *Method and System for Providing Congestion Management within a Virtual Talk Group*.

Shaffer, et al., U.S. Appl. No. 11/746,960, filed May 10, 2007, *Method and System for Handling Dynamic Incidents*.
Shaffer, et al., U.S. Appl. No. 11/550,234, filed Oct. 17, 2006, *Method and System for Providing an Indication of a Communication*.
NetworkFirst Interoperability Solved, Data Sheet, M/A-COM, Inc., ECR-7018A, http://www.networkfirst.com/resources/pdf/NetworkFirstRevised5_03.pdf, 6 pages, May 2003.
Network Solution:, Information Sheet, NetworkFirst, M/A-COM, Inc., http://www.networkfirst.com/features/solution, 2 pages, 2003.
ACU-1000™ Interoperability NOW™, Information Sheet, Raytheon JPS Communications, http://www.jps.com/downloads/PDFS/acuupgrade.pdf, 4 pages, Mar. 2004.
Interoperability Gateway, OpenSky, NetworkFirst, P25$^{IP}$, Data Sheet, M/A-COM, Inc. ECR-7054, http://www.opensky.com/network/7054.pdf, 2 pages, May 2003.
C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages, Oct. 2003.
V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages, Oct. 2004.
Cisco IP Interoperability and Collaboration System, Q&A, Copyright © Cisco Systems, Inc. www.cisco.com, 4 pages, Oct. 2005.
Cisco IPICS, Solution Overview, Copyright © Cisco Systems, Inc., www.cisco.com/go/ipics, 6 pages, Oct. 2005.
MRT Urgent Communications: Service, Safety, Security, M/A-Com Emphasizes Power of IP in Seven Announcements at APCO, Aug. 18, 2002, 6 pages. http://mrtmag.com/products/new/radio_macom_emphasizes_power.
Jim McKay, *Government Technology*, "Intact Amid Chaos", Mar. 2005, 2 pages.
Ian Hoffman, *Oakland Tribune*, "Oakland's New Radios Pass Test, City, Regional Agencies Get Green Light to Buy Public-Safety Equipment," 2007, 2 pages (reprinted by Tyco Electronics and available at http://www.macom-wireless.com/news/oaklands%20new%20radios.asp), Mar. 11, 2005.
MRT Urgent Communications: Service, Safety, Security, "5 For '05 Technologies," Dec. 1, 2004, 9 pages. http://mrtmag.com/mag/radio_technologies.
MRT Urgent Communications: Service, Safety, Security, John Facella, "ROIP Success Is in the Details," Dec. 1, 2004, 3 pages. http://mrtmag.com/mag/radio_roip_success_details.
Ann Imse, *Rocky Mountain News*, "Radio Breakthrough for Cops, Firefighters," Dec. 10, 2004, 2 pgs.
*First Responder Communications*, A Supplement to MRT and Fire Chief, "IP Opens Eyes," Aug. 2004, 5 pages.
*MRT, Mobile Radio Technology*, "IP Evangelist," Apr. 2004, 4 pages, www.iwce-mrt.com.
Ron Bender, et al., *MRT; Mobile Radio Technology* "Multiple Choices for Critical Communications," Oct. 2001, 4 pages, www.mrtmag.com.
Jay Herther, et al., *MRT; Mobile Radio Technology*, "Voice-over-Interintranet Protocol for Critical Communications," Aug. 2001, 4 pages, www.mrtmag.com.
*What's New in Radio Communications*, Aug./Sep. 2001, vol. 14 No. 1, Inside: Marine Radio, 2 pages, www.westwick-farrow.com.au.
PCT International Search Report and Written Opinion (ISA/US) for PCT/US06/19227; 7 pages, Sep. 4, 2007.
Rivero-Angeles, Mario et al., *Random-Access Control Mechanism Using Adaptive Traffic Load in ALOHA and CSMA Strategies for EDGE*, May 2005, IEEE Transactions on Vehicular Technology, Vo. 54, No. 3, 2 (1161) May 2005.
Shaffer et al., U.S. Appl. No. 11/149,041 filed Jun. 11, 2005, Communication from the U.S. Patent and Trademark Office mailed Sep. 14, 2006.
Shaffer et al., U.S. Appl. No. 11/149,041 filed Jun. 11, 2005, Communication from the U.S. Patent and Trademark Office mailed Mar. 12, 2007.
Shaffer et al., U.S. Appl. No. 11/149,041 filed Jun. 11, 2005, Communication from the U.S. Patent and Trademark Office mailed Jan. 24, 2008.
Shaffer et al., U.S. Appl. No. 11/149,041 filed Jun. 11, 20051, Communication from the U.S. Patent and Trademark Office mailed Jul. 30, 2008.
Shaffer et al., U.S. Appl. No. 11/149,041 filed Jun. 11, 2005, Communication from the U.S. Patent and Trademark Office mailed Jan. 8, 2009.
Shaffer et al., U.S. Appl. No. 11/202,400 filed Aug. 10, 2005, Communication from the U.S. Patent and Trademark Office mailed Jul. 31, 2007.
Shaffer et al., U.S. Appl. No. 11/202,400 filed Aug. 10, 2005, Communication from the U.S. Patent and Trademark Office mailed Apr. 25, 2008.
Shaffer et al., U.S. Appl. No. 11/202,400 filed Aug. 10, 2005, Communication from the U.S. Patent and Trademark Office mailed Mar. 9, 2009.
Shaffer et al., U.S. Appl. No. 11/214,582 filed Aug. 29, 2005, Communication from the U.S. Patent and Trademark Office mailed Oct. 22, 2007.
Shaffer et al., U.S. Appl. No. 11/214,582 filed Aug. 29, 2005, Communication from the U.S. Patent and Trademark Office mailed Mar. 28, 2008.
Shaffer et al., U.S. Appl. No. 11/214,582 filed Aug. 29, 2005, Communication from the U.S. Patent and Trademark Office mailed Sep. 16, 2008.
Shaffer et al., U.S. Appl. No. 11/214,582 filed Aug. 29, 2005, Communication from the U.S. Patent and Trademark Office mailed Mar. 16, 2009.
Shaffer et al., U.S. Appl. No. 11/365,113 filed Feb. 28, 2006, Communication from the U.S. Patent and Trademark Office mailed Feb. 3, 2009.
Shaffer et al., U.S. Appl. No. 11/202,403 filed Aug. 10, 2005, Communication from the U.S. Patent and Trademark Office mailed Sep. 28, 2007.
Shaffer et al., U.S. Appl. No. 11/202,403 filed Aug. 10, 2005, Communication from the U.S. Patent and Trademark Office mailed Apr. 1, 2008.
Shaffer et al., Communication from the United States Patent and Trademark Office mailed Jun. 17, 2009 in re U.S. Appl. No. 11/149,041 filed Jun. 8, 2005.
Shaffer et al., U.S. Appl. No. 11/365,113 filed Feb. 28, 2006, Communication from the U.S. Patent and Trademark Office mailed Jul. 29, 2009.

* cited by examiner

| VIRTUAL TALK GROUP | SCENE | MEMBERS |
|---|---|---|
| 1 | 403 | 402a, 402b, 402c, 402d, 406 |
| 2 | 405 | 404a, 404b, 404c, 404d, 404e, 408 |
| 3 | 411 | 410a, 410b, 410c |
| 4 | 406 | 406 |

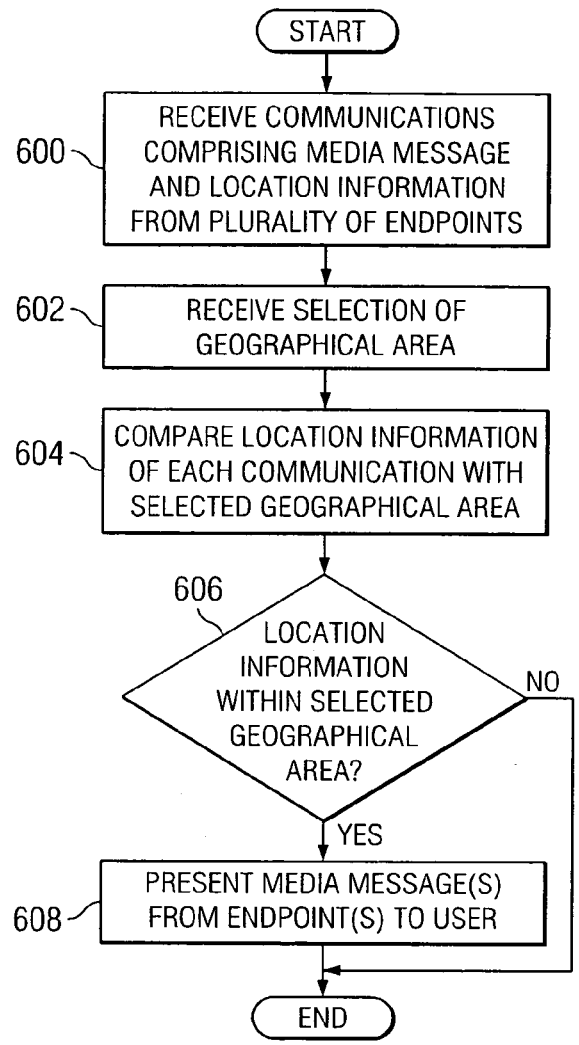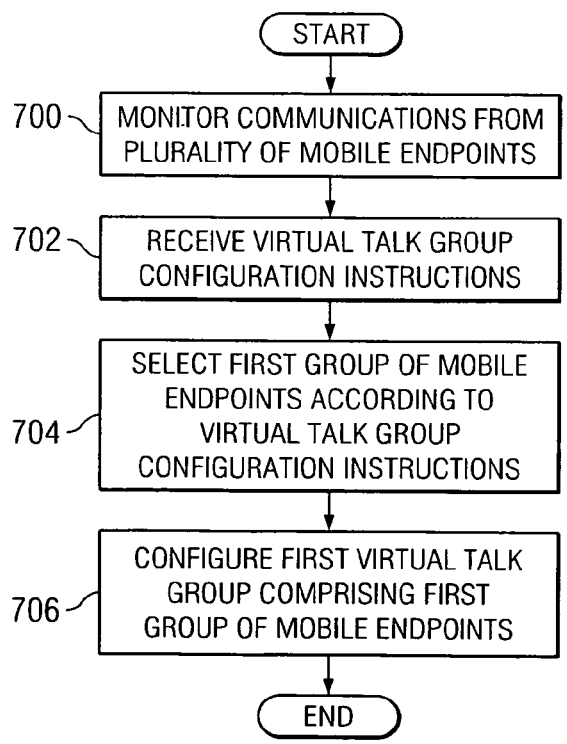

METHOD AND SYSTEM FOR AUTOMATIC CONFIGURATION OF VIRTUAL TALK GROUPS BASED ON LOCATION OF MEDIA SOURCES

TECHNICAL FIELD OF THE INVENTION

This invention relates in general to communication systems and, more particularly, to a method and system for automatic configuration of virtual talk groups based on location of media source.

RELATED APPLICATION

This application is related to U.S. patent application Ser. No. 11/202,403, entitled "METHOD AND SYSTEM FOR PROVIDING INTEROPERABLE COMMUNICATIONS WITH LOCATION INFORMATION," filed concurrently with the present application, and to U.S. patent application Ser. No. 11/202,400, entitled "METHOD AND SYSTEM FOR COMMUNICATING MEDIA BASED ON LOCATION OF MEDIA SOURCE," filed concurrently with the present application.

BACKGROUND OF THE INVENTION

Many public and private groups, such as security and safety personnel (e.g., police, fire fighters and ambulance drivers) use various communication networks of differing technologies and types for communication. Many networks utilize land mobile radios communicating through push-to-talk technologies. However, communications among different endpoints of different networks such as endpoints of different police, fire or other security networks may be difficult. Collaboration between the different agencies and networks tends to be ad hoc and inefficient. When achieved, it often involves laborious manual intervention. Organizations working towards interoperability solutions include Raytheon JPS Communications, IP Blue, Twisted Pair, M/A-COM and Cisco Systems.

SUMMARY OF THE INVENTION

The present invention provides a method and system for automatic configuration of virtual talk groups based on location of media source that substantially eliminates or reduces at least some of the disadvantages and problems associated with previous methods and systems.

In accordance with a particular embodiment, a method for providing interoperable communications with location information includes receiving communications from a plurality of virtual talk groups. Each virtual talk group comprises a plurality of endpoints of different communication networks. The method includes receiving from a first mobile endpoint of a first virtual talk group of the plurality of virtual talk groups a first communication. The first communication comprises a first media message and location information identifying a location of the first mobile endpoint. The method includes presenting to a user the first media message from the first mobile endpoint and the location of the first mobile endpoint.

In accordance with another embodiment, a method for automatic configuration of virtual talk groups based on location of media source includes monitoring communications from a plurality of mobile endpoints. Each communication comprises a media message and location information identifying a location of its transmitting endpoint. The method includes selecting a first group of mobile endpoints of the plurality of endpoints according to virtual talk group configuration instructions based on the locations of the mobile endpoints. The method also includes configuring a first virtual talk group comprising the first group of mobile endpoints to facilitate communications among the first group of mobile endpoints. The first group of mobile endpoints comprises mobile endpoints of different communication networks.

In accordance with an additional embodiment, a method for communicating media based on location of media source includes receiving communications from a plurality of endpoints. Each communication comprises a media message and location information identifying a location of its transmitting endpoint. The method includes receiving a selection of a geographical area and comparing the location information of each communication with the selected geographical area. The method also includes presenting to a user each message received from each endpoint of the plurality of endpoints located within the selected geographical area.

Technical advantages of particular embodiments include systems and methods for providing interoperable communications among endpoints of various types that utilize differing technologies. Virtual talk groups may be created dynamically to enable communication among a subset of endpoints for particular circumstances, such as particular security events that arise. Particular embodiments present to a user location information of an endpoint communicating through an interoperable communication system so that the user may more easily monitor various endpoints and various virtual talk groups of a subset of endpoints. As a result, the user may be better able to make decisions based on current communications. Embodiments may also provide an identification of a particular virtual talk group of which the communicating endpoint is a member, particularly when a user is receiving communications from endpoints of a plurality of virtual talk groups.

In addition, in some embodiments a user may be able to select a geographical area and receive interoperable communications from all endpoints within the selected geographical area. For example, the user's endpoint may receive communications from a plurality of endpoints from multiple areas and may filter those communications to present to the user only communications from endpoints transmitting from the selected geographical area. This enables a user to monitor only communications of interest for critical security or other needs. Moreover, particular embodiments provide automated configuration of endpoints into virtual talk groups based on the locations of the endpoints. For example, according to configuration instructions from a user, a virtual talk group may be automatically configured as including endpoints of a particular neighborhood, such as endpoints within a configurable distance from an event or as all endpoints who are in proximity to the user.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 8 illustrates a method for communicating media based on location of media source, in accordance with a particular embodiment; and FIG. 9 illustrates a method for automatic configuration of virtual talk groups based on location of media source, in accordance with a particular embodiment.

DETAILED DESCRIPTION

Figure 1:
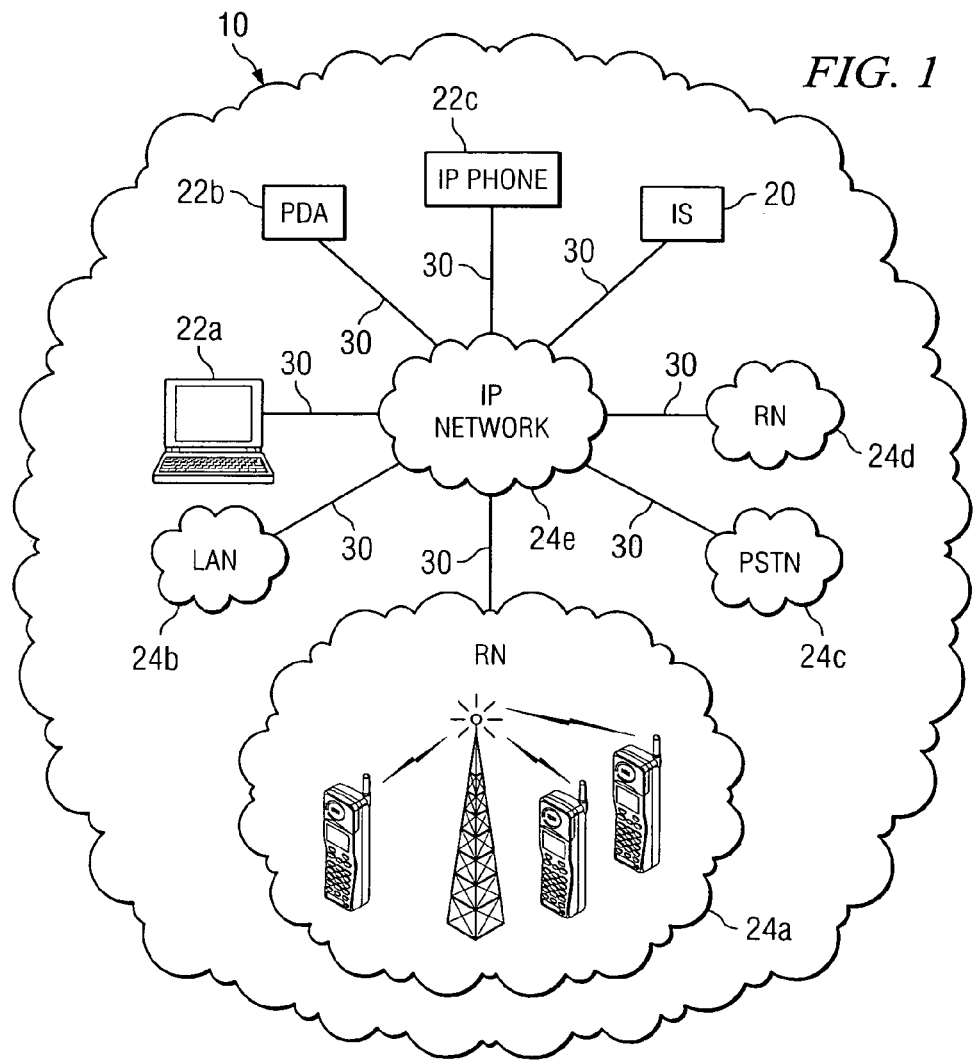
FIG. 1 illustrates a communication system with various communication networks and an interoperability system, in accordance with a particular embodiment.

FIG. 1 illustrates a communication system 10, in accordance with a particular embodiment. Communication system 10 includes communication networks 24a-24e, interoperability system (IS) 20 and endpoints 22a-22c. IS 20 is able to facilitate interoperable communication sessions between and among various communication devices, such as endpoints of communication networks 24 and endpoints 22. IS 20 uses a systems approach to offer a framework based on IP protocols and services to immediately achieve secure voice, video and other data interoperability among communication endpoints and networks utilizing different technologies.

In particular embodiments when a user of a mobile endpoint communicates audio, video or other information to one or more other endpoints, GPS information identifying the mobile endpoint's location is included in the transmission such that the mobile endpoint's location can be presented to the one or more other endpoints in connection with the communicated audio, video or other information. In some embodiments, GPS information may be steganographically embedded within a communication stream, such as a voice stream. The communication of location information may be used to notify a user monitoring various endpoints and various virtual talk groups of a subset of endpoints of the location of a particular transmitting endpoint. Thus, the user may be better able to make decisions based on current communications.

In some embodiments, a user may be able to select a geographical area and have presented by the user's endpoint communications from all endpoints within the selected geographical area. The endpoint may receive communications from additional endpoints but may filter out for presentation to its users only those communications from endpoints within the selected area. This enables a user to monitor only communications of interest for critical security or other needs.

Moreover, particular embodiments provide automated configuration of endpoints into virtual talk groups based on the locations of the endpoints. For example, according to configuration instructions from a user, a virtual talk group may be automatically configured as including endpoints of a particular neighborhood, such as endpoints within a configurable distance from an event or as all endpoints who are in proximity to the user.

In the illustrated embodiment, communication networks 24a and 24d comprise radio networks (RNs), communication network 24b comprises a local area network (LAN), communication network 24c comprises a PSTN and communication network 24e comprises an IP network. It should be understood, however, that communication system 10 may comprise any number of IP or non-IP communication networks of any wireless or wireline form capable of communicating audio and/or video telecommunication signals, data, and/or messages, including signals, data or messages. Communication networks 24a-24e may include any number and combination of segments, nodes and endpoints to enable communication among network devices and components. Communication networks 24a-24e may be distributed locally or across multiple cities and geographic regions. Nodes may include any combination of network components, gatekeepers, call managers, conference bridges, routers, hubs, switches, gateways, base stations, endpoints or other hardware, software or embedded logic implementing any number of communication protocols that allow for the exchange of data in communication system 10. Segments 30, which may comprise any suitable wireless or wireline communication links, including one or more communication networks (e.g., WANs) as appropriate, couple various networks with each other and with endpoints 22 and IS 20. In particular embodiments, segments may include gateways for facilitating communication between various networks, such as an LMR gateway between radio network 24a and IP network 24e.

In some cases, users of endpoints of one of communication networks 24a-24e may communicate with endpoints of another of communication networks 24a-24e through IS 20. A radio network, such as radio network 24a or 24d, may support communication among portable mobile station endpoints, such as land mobile radios (LMRs), using any suitable communication methods or features, such as cellular and push-to-talk (PTT). Communication networks 24a-24e may comprise networks of particular groups or agencies (e.g., a municipality's police department network), whether operational with respect to a particular area or otherwise.

IS 20 enables, facilitates and/or provides for interoperable communication among communication endpoints and devices, such as LMRs, cellular phones, IP phones, PCs, PDAs, PSTN phones, video monitors, cameras and sensors of one or more communication networks (e.g., communication networks 24a-24e) using Internet Protocol. Such endpoints may comprise IP or non-IP-enabled endpoints. In particular embodiments, IS 20 may control gateways (for example, of segments 30) in order to map radio frequencies of particular mobile radio endpoints to IP addresses for communication to other types of radio endpoints or IP devices. For example, a particular gateway may be able to receive communications from various types of endpoints (e.g., on various types of communication networks) and may convert such communications for transmission to other types of endpoints. IS 20's control of the gateway may control the various endpoints and/or networks that receive particular communications, depending on system functionality and configuration as further discussed below. As indicated, such control may include the mapping of communications and endpoints to IP addresses for interoperable communication. In some embodiments, IS 20 may host audio conferences that bridge communications received from endpoints. As indicated above, communication system 10 (including IS 20) may include any suitable number or type of gateways (e.g., LMR and PSTN gateways), servers (e.g., multipoint conference servers), switches, routers, firewalls, access points, processors, memory or other hardware, software or encoded logic to provide functionality described herein. IS 20 is coupled to communication networks 24a-24d and endpoints 22 through IP network 24e, which may comprise any suitable IP network.

As indicated above, IS 20 uses IP to enable communication among endpoints of various networks. The manner in which IS 20 facilitates communications among endpoints may vary according to location and system or operational needs. For example, IS 20 may communicate with endpoints using multicast IP addresses assigned to an endpoint of a communication network, a group of endpoints of a communication network or one or more endpoints of multiple communication networks or alternatively using a peer to peer dialed connection or a nailed dialed connection. A group of endpoints may be combined into a virtual talk group for communication using a particular IP address. As an example, the virtual talk group may be assigned a multicast IP address through which users of various endpoints may communicate on the talk group. The use of multicast IP addresses allows IS 20 to facilitate communications among communication devices and endpoints of various communication networks to provide audio, data, video and control network interoperability. As an additional example, in some cases multicast streams (e.g., utilizing multicast IP addresses) may be used. In some cases nailed dialed connections, such as those using SIP protocol, may be used for communication among endpoints and with IS 20. Various embodiments may combine communication methods to facilitate communication among endpoints. For example, in some cases certain endpoints of a virtual talk group may participate in the talk group through a multicast IP address while other endpoints may utilize a nailed SIP connection. IS 20 may control this participation, such as by controlling gateways, multipoint conferences and the mapping of communications to IP addresses.

IS 20 may be utilized and implemented in any number of market segments, such as enterprise safety and security (e.g., loss prevention), transportation, retail, public safety and federal agencies in order to provide radio and non-radio network interoperability within and between such market segments. As indicated above, such network interoperability includes the interoperability of push-to-talk voice technology within various networks and the interoperability between push-to-talk and full duplex dialed connections.

It will be recognized by those of ordinary skill in the art that endpoints 22 and IS 20 may be any combination of hardware, software, and/or encoded logic that provides communication services to a user. In the illustrated embodiment, endpoints 22 comprise a PC (endpoint 22a), a PDA (endpoint 22b) and an IP phone 22c. However, in other embodiments, endpoints 22 may include a telephone, a personal computer (PC), a video monitor, a camera, an IP phone, a cell phone, a land mobile radio (LMR), a personal digital assistant (PDA), a command center or any other communication hardware, software and/or encoded logic that supports the communication of audio, video or other data, using packets of media (or frames) or otherwise, through communication system 10. Endpoints 22 as well as endpoints and components of communication networks 24 may be capable of communicating using any particular type of technology, such as cellular, IP, PSTN, CDMA, GSM, TDMA and satellite. Endpoints 22 and IS 20 may also include unattended or automated systems, gateways, other intermediate components or other devices that can establish media sessions.

Although the illustrated embodiment includes five communication networks 24a-24e, the term "communication network" should be interpreted as generally defining any network capable of transmitting audio and/or video telecommunication signals, data, and/or messages, including signals, data or messages. Any one of networks 24a-24e may be implemented as a local area network (LAN), wide area network (WAN), cellular network, global distributed network such as the Internet, Intranet, Extranet, PSTN, LMR network, CDMA network, GSM network, TDMA network, satellite network or any other form of wireless or wireline communication network.

Communications over communication networks 24a-24e may use any suitable communication protocol. In a particular embodiment, some communication networks may employ voice communication protocols that allow for the addressing or identification of endpoints, nodes, and/or other components coupled to the communication network. For example, using Internet protocol (IP), each of the components coupled together by, for example, communication network 24b in communication system 10 may be identified in information directed using IP addresses. In this manner, network 24b may support any form and/or combination of point-to-point, multicast, unicast, or other techniques for exchanging media packets among components in communication system 10. Any network components capable of exchanging audio, video, or other data are included within the scope of the present invention.

Since IP networks share a common method of transmitting data, telecommunication signals may be transmitted between telephony devices located on different, but interconnected, IP networks. In addition to being coupled to other IP networks, communication network 24b may also be coupled to non-IP telecommunication networks, for example through the use of interfaces or components, including gateways. In the illustrated embodiment, communication network 24b may be coupled with PSTN 24c through a gateway. In some embodiments the gateway may be a part of IS 20 or network 24e.PSTN 24c includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 24c), a dedicated circuit is not required for the duration of a call or fax transmission over IP networks.

Technology that allows telecommunications to be transmitted over an IP network may comprise Voice over IP (VOIP), or simply Voice over Packet (VoP). In the illustrated embodiment, one or more of endpoints 22, and endpoints and components of communication networks 24 may be IP telephony devices capable of participating in IM, video, and other multimedia communication sessions. IP telephony devices have the ability of encapsulating a user's voice (or other input) into IP packets so that the voice can be transmitted over a communication network. IP telephony devices may include telephones, fax machines, computers running telephony software, nodes, gateways, wired or wireless devices, hand held PDAs, or any other device capable of performing telephony functions over an IP network.

In particular embodiments, communication system 10 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

Although FIG. 1 illustrates a particular number and configuration of endpoints, IS and communication networks, communication system 10 contemplates any number or arrangement of such components for communicating media.

Figure 2:
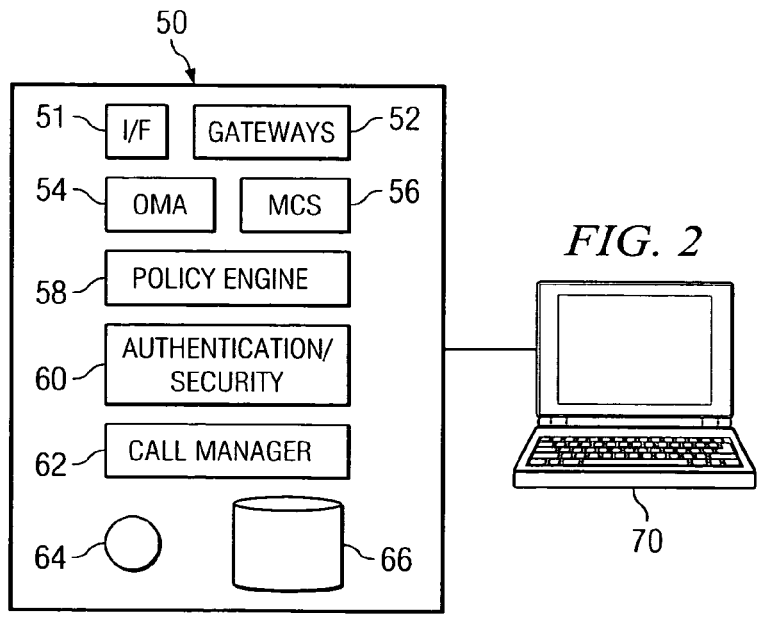
FIG. 2 illustrates an example interoperability system, in accordance with a particular embodiment.

FIG. 2 illustrates interoperability system (IS) 50, in accordance with a particular embodiment. IS 50 may be similar to and provide the same functionality as IS 20 of FIG. 1. In the illustrated embodiment, IS 50 includes interface 51, gateways 52, operations management application (OMA) 54, multipoint conference system (MCS) 56, policy engine 58, authentication and security system 60, call manager 62, processor 64 and memory module 66. IS 50 is coupled to a PC endpoint 70 that may be used to access, configure and control various functionality provided by IS 50. PC endpoint 70 may run a client application for such access, configuration and control.

The client application may enable a user of endpoint 70 to receive and monitor communications from various endpoints and virtual talk groups. In particular embodiments, other types of endpoints may be utilized to access, configure and control IS 50, such as IP phones, PDAs and mobile devices. IS 50 may be coupled to such endpoints (including PC endpoint 70) through one or more communication networks.

Interface 51 is used in the communication of audio, video, signaling and other data between IS 50 and other network components. For example, interface 51 may receive communications from endpoints such as endpoints of communication networks 24, endpoints 22 and endpoint 70. The communication may take place over IP networks thereby negating the need for dedicated wiring between the endpoints and the IS.

Gateways 52 may include any suitable gateways to provide network interoperability and back-end legacy application integration, such as LMR gateways, PSTN gateways and application gateways. Gateways 52 provide mapping between IP services and the interoperable networks, such as LMR network 24a of FIG. 1. In some cases gateways 52 may not be located within an IS but may be distributed throughout a communication system for enabling communications among various communication networks.

Operations management application (OMA) 54 includes functionality for configuration, management and control of IS 50, including conference and collaboration management, and may be accessed by a user via, for example, PC endpoint 70. In particular embodiments, OMA 54 may enable a user, such as dispatch personnel or administrators or a mobile user (e.g., a first responder mobile user) accessing IS 50 via a mobile endpoint, the ability to configure, manage and participate in one or more virtual talk groups and ad hoc conferences simultaneously. In particular embodiments, OMA 54 may be accessed through a web interface, functioning for example as a soft phone for radios. A screen display may be controlled using a mouse, keypad, touch screen, voice commands or any other suitable interface. OMA 54 screens may include any number of functional controls to provide interoperable communications. OMA 54 may authenticate a user and obtain user configuration information upon a user accessing the OMA. OMA 54 may monitor and provide communication ability for any number of channels at one time to provide the ability for an OMA user to communicate on and control multiple virtual talk groups at once.

Multipoint conference system (MCS) 56 provides collaboration and conference services for multiple endpoints of one or more networks. For example, users of multiple endpoints (such as LMRs of different networks (e.g., networks of different agencies or groups) and different types of endpoints of different networks) may be bridged together through MCS 56 to provide virtual talk group communications. MCS 56 may include any suitable number or type of conference bridges, ports, digital signal processors or other components to facilitate communications discussed herein.

Policy engine 58 includes policies for undertaking various operations and functionality upon the occurrence of various events to provide dynamic incident management. These policies may include both pre-determined and ad hoc policies. For example, upon the occurrence of a particular incident, the incident may include a unique identifier and may have basic incident attributes such as time of creation, name of user creating and status. A pre-determined policy may then be executed by an incident manager or dispatch personnel as action for the specific incident. In particular embodiments, policy engine may receive inputs from alarms and sensors to setup device agnostic communications interoperability and one-way video and data collaboration and to trigger additional events such as pagers, e-mails, notifications, dial-outs, recording and information escalation.

Authentication and security system 60 manages access, configuration and control privileges for users of IS 50 and those participating in interoperable communications. For example, different users may have different privileges assigned for interoperable communications. Some users may only have transmit or listen privileges with respect to one or more particular talk groups, while other users may have the ability to communicate in all talk groups or setup and configure various talk groups. User privileges may change dynamically upon the occurrence of particular events.

Call manager 62 maintains information regarding various users, such as users of IP networks for which interoperable communications are provided by IS 50. This facilitates in the extension of PTT to IP networks and in the provision of voice and data interoperability across radio and non-radio networks. In particular embodiments, call manager 62 may maintain a listing, table, or other organization of information about users. The information may include a name or other identifier and contact information such as phone numbers and email addresses for the users. In particular embodiments call manager 62 may represent any appropriate combination of hardware, software and/or encoded logic distributed throughout a communication network coupled with IS.

Processor 64 may be a microprocessor, controller, or any other suitable computing device, resource, or combination of hardware, software and/or encoded logic operable to provide, either alone or in conjunction with other IS components such as OMA 54, IS 50 functionality. Such functionality may include providing various features discussed herein to a user, such as a user of an endpoint accessing IS 50 through OMA 54. Such features may include providing to the user endpoint location information of communicating endpoints of a plurality of monitored endpoints and/or virtual talk groups, enabling the user to listen to and/or participate in communications involving endpoints and/or virtual talk groups of a particular geographic area, presenting communications of endpoints of scene-related virtual talk groups according to preconfigured or received instructions and controlling various gateways and other network components to facilitate interoperable communications among various endpoints.

Memory module 66 may be any form of volatile or non-volatile memory including, without limitation, magnetic media, optical media, random access memory (RAM), read-only memory (ROM), removable media, or any other suitable local or remote memory component. Memory module 66 may store any suitable data or information, including software and encoded logic, utilized by IS 50. In particular embodiments, memory module 66 may include data for user management, talk-group management, resource pool management, privileges, backup configuration and information and/or timestamp and activity tracking.

IS 50 may also include any number of switches, routers, firewalls, mobile access routers, access points, wireless bridges and other components in order to accommodate particular operational desires and needs.

In particular embodiments such as in the LMR network interoperability context, IS 50 may, through one or more components discussed above or through other components, encode received audio with a standard audio codec, such as G.711 or G.729.Those audio samples may be packaged in standards-based real-time transport protocol (RTP) packets suitable for transport on an IP network. At this point, the communication element may be abstracted from the distinctive characteristics of each radio system. These audio packets can be sent across the network to other radio systems either individually (unicast) or as a group (multicast). The recipient of the audio packets may be a device capable of receiving and decoding the RTP stream, such as an IP telephone or PC with appropriate software. The IP network and IP-enabled devices can be used to allow users to monitor or transmit on a particular radio channel from a desk without issuing another radio.

As indicated above, IS 50 may facilitate communication among users of endpoints of various networks through virtual channels or talk groups. For example, a channel may comprise a unidirectional or bidirectional path for transmitting and/or receiving electrical or electromagnetic signals. This may comprise, for example, a conventional radio physical RF channel. A talk group in this context may be a subgroup of users (e.g., radio users) who share a common functional responsibility and typically coordinate actions amongst themselves without radio interface with other subgroups. For example, a municipality's police department network may include various talk groups.

A virtual talk group (VTG) represents interoperability of a group of channels, for example, as an audio conference or meeting. A virtual talk group may include an associated virtual channel and an ID. Virtual channels may comprise an address, such as an IP address, associated with a virtual talk group through which users may access the virtual talk group and/or through which communications from VTG member-endpoints are bridged. Various types of virtual talk groups may be utilized in particular embodiments, such as a multicast address usable by all endpoints of the VTG, a VTG comprising multiple talk groups (e.g., multiple radio sources from different frequencies whose communications are mixed), a unicast group and a combination unicast and multicast group.

As an example, a particular virtual talk group may comprise a conference or meeting of the following: (1) a channel or other multicast path used by certain users of a police department's radio network, (2) a channel or other multicast path used by certain users of a fire department's radio network, (3) a channel or other multicast path used by certain users of a corporation's security radio network and (4) a plurality of users of IP-enabled endpoints such as IP phones, IP-enabled PDAs or PCs. An operator of IS 50 may configure the virtual talk group using any suitable interface, such as by dragging and dropping the included channels and IP endpoints into a single area representing the virtual talk group. MCS 56 may provide the functionality for the conference of the virtual talk group members. In particular embodiments, multiple talk groups may be patched together on a dynamic, as needed basis. In some cases a virtual talk group may not necessarily include communications through an IS but may instead include member endpoints whose communications are mapped to IP addresses at gateways (such as LMR gateways) controlled by an IS.

Any number of virtual talk groups may be configured to provide any suitable audio, data, video and control network interoperability. Virtual talk groups may be created using any suitable user/endpoint groups or channels based on location, organizational requirements, event requirements or any other suitable characteristic. An administrator or operator may configure channel details such as name, description, participants, multicast IP addresses, codec and latch options through, for example, OMA 54.

Figure 3:
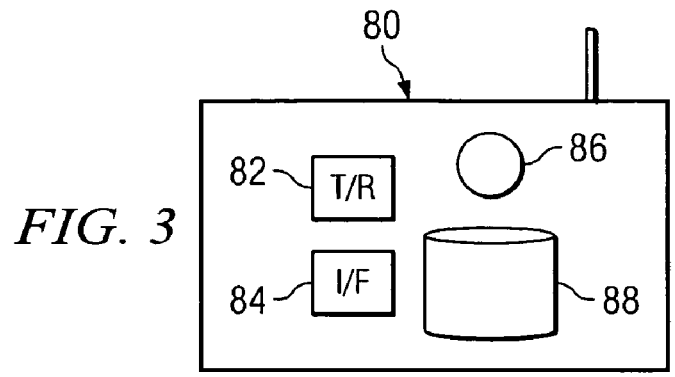
FIG. 3 illustrates an example endpoint, in accordance with a particular embodiment.

FIG. 3 illustrates an endpoint 80, which may comprise a mobile endpoint, in accordance with a particular embodiment. Endpoint 80 may be similar to, and may provide similar functionality to, other endpoints discussed herein.

In the illustrated embodiment, endpoint 80 includes a transmitter/receiver 82, a user interface 84, a processor 86 and a memory module 88. Transmitter/receiver 82 obtains signals from GPS satellites or ground stations of a communication network in order to determine a position of endpoint 80 and also receives and transmits communications such as audio, video and other data to and from other network components.

User interface 84 provides a mechanism through which a user of endpoint 80 may operate the endpoint and communicate with other network devices. Interface 84 may comprise a keypad, display, touch screen, audio input or any other suitable interface. Instructions may be submitted through speech recognition, collection of keystrokes, soft key or otherwise.

Processor 86 may be a microprocessor, controller, or any other suitable computing device, resource, or combination of hardware, software and/or encoded logic operable to perform endpoint functionality. Processor 86, either alone or in conjunction with other endpoint components, provides endpoint functionality discussed herein. Memory module 88 may be any form of volatile or non-volatile memory including, without limitation, magnetic media, optical media, random access memory (RAM), read-only memory (ROM), removable media, or any other suitable local or remote memory component.

In particular embodiments, communications from endpoints such as endpoint 80 may include GPS information indicating the location of the endpoint from which a particular communication is transmitted. The GPS information may be carried by both unicast and multicast communications. With this information, whenever a user utilizes an endpoint to communicate, the specific location from where the media (e.g., PTT or other communication) was transmitted may be identified, for example at PC endpoint 70 through IS 50. In some cases, a gateway may be used to bridge between media streams that include location information of a transmitting endpoint and media streams that do not include location information of a transmitting endpoint. For example, some legacy mobile devices may not be able to embed or otherwise include GPS information within a media stream.

In particular embodiments, endpoint 80 may be used by a command officer or other user and may run a client application of IS 50. In some cases endpoint 80 may receive communications from a plurality of endpoints, and processor 86 may filter out certain communications for presentation to a user of endpoint 80 based on the location of the transmitting endpoints of the communications. As discussed herein, communications received may include GPS or other location information identifying locations of their transmitting endpoints.

As discussed above, particular embodiments provide the ability to transport geographical location information from mobile endpoints to each other and to an IS and the utilization of this information for displaying the location (e.g., as a street or block number within a city or in another manner) to other users, as well as presenting an icon associated with the specific mobile endpoint and with its location. In some embodiments GPS information may be appended to a multicast stream in a header of a packet transmission or to a unicast stream. GPS information may be carried by being steganographically embedded within a voice stream or in the header of IP packets. With the location information, whenever an end-user at a mobile station talks, rather than simply having an indicator show the VTG of the last communication, an icon or other indicator (e.g., on a map) may show the specific location from where the media (e.g., PTT media) arrived. In some cases, special attention may be given to conferencing when more than one speaker talks when, for example, SIP and unicast may be used. In this case the plurality of location information from all talkers may be embedded within the media stream, and all icons of all speakers may blink to indicate where the speakers are located. Particular embodiments also provide backwards compatibility to existing systems. For example, when a speaker from an unknown location speaks, the system may indicate the VTG over which the voice came, but the location of that speaker may not be presented on the map.

Furthermore, particular embodiments provide the ability of an endpoint such as endpoint 80 to filter communications presented to its user based on the location of transmitting endpoints of the communications. For example, an endpoint used by personnel monitoring a plurality of interoperable communications facilitated by an IS (such as endpoint 80 running a client application of IS 50) may receive many media streams from a variety of VTGs. The endpoint may present to its user only the media streams that originate from within a pre-defined neighborhood. As discussed above, communications may include GPS information of transmitting endpoints appended to multicast and/or unicast media streams. In some cases the user may draw an area of interest on a map, and the communications that originate with the area may be filtered for presentation to the user. For example, when a supervisor wants to listen to activities from a specific site, he can click on that area of the map and/or highlight a specific area on the map and select a "listen" or "participate" function. As discussed above, in one embodiment the filter steps may be performed at the user's endpoint. In some embodiments, the filter may be generated at an IS and downloaded to the relevant endpoint. This allows the filter to be stored and managed from a central IS. In some embodiments a user such as a policeman may want to obtain information from sensors in his area of interest. In this embodiment, GPS information may be embedded in the information stream from the specific sensors. In some cases, as the system establishes a conference of users or a VTG, the location information is used in the speaker selection algorithm. For example, in accordance with one embodiment, as the system selects the top three speakers, the speakers who are closest to the center of the event are given priority over users who are farther away from the center of the event.

Moreover, particular embodiments provide automated configuration of endpoints into VTGs based on their locations. GPS information is appended to multicast and/or unicast media streams. In one embodiment, a user through a client application may establish connection with an IS, such as IS 50, and may continuously update the IS regarding the user's location. Using GPS source location, the IS may configure endpoints as participants in a VTG that spans their neighborhood. In some embodiments, the neighborhood may be defined by a configurable distance from an event or as all endpoints who are in proximity to the user (e.g., within 4 miles from the user). In other embodiments, the neighborhood may be defined by drawing an area on a map on the user's endpoint display. By defining the area of the neighborhood, the client application user's endpoint may be automatically joined into a VTG with all users whose locations fall within the defined neighborhood. In addition, participant endpoints in the VTG may dynamically change (e.g., may be added and removed from the VTG) since the endpoints may be mobile and their locations may continuously change.

In some cases, the IS may apply hysteresis. As a result, once a user joins the geographically defined VTG he may remain a member through the end of the event. In some cases, hysteresis may be utilized based on an area. For example, once a user is automatically added to a geographically defined VTG based on the user's location within a first area, the user may remain a member of the VTG despite leaving the first area as long as the user is within a second, larger area that includes the first area. Hysteresis may be applied to any of the functionality discussed herein, including the mere receipt of communications from endpoints within a particular area. In some cases, a user may elect to opt out of the VTG if he travels out of the area defined by the system as the event location area. Embodiments may automatically conference users who are joining the VTG via unicast with, e.g., SIP signaling. Some embodiments may also automatically and dynamically add and drop users into/from a conference bridge using hysteresis as a key part of an add/drop user algorithm. In one embodiment, users of endpoints may be requested to approve the automatic action of dropping them out of the VTG. In some cases, a user traveling through different areas may be coming in and out of multicast range. An IS in some embodiments may automatically switch the user between multicast connectivity and a nailed SIP connection to accommodate capabilities of a locally available network. In addition, in some cases if a user is continuously moving in and out of a multicast area, the IS may fix their connectivity to a VTG via a nailed dialed connection.

Figure 4:
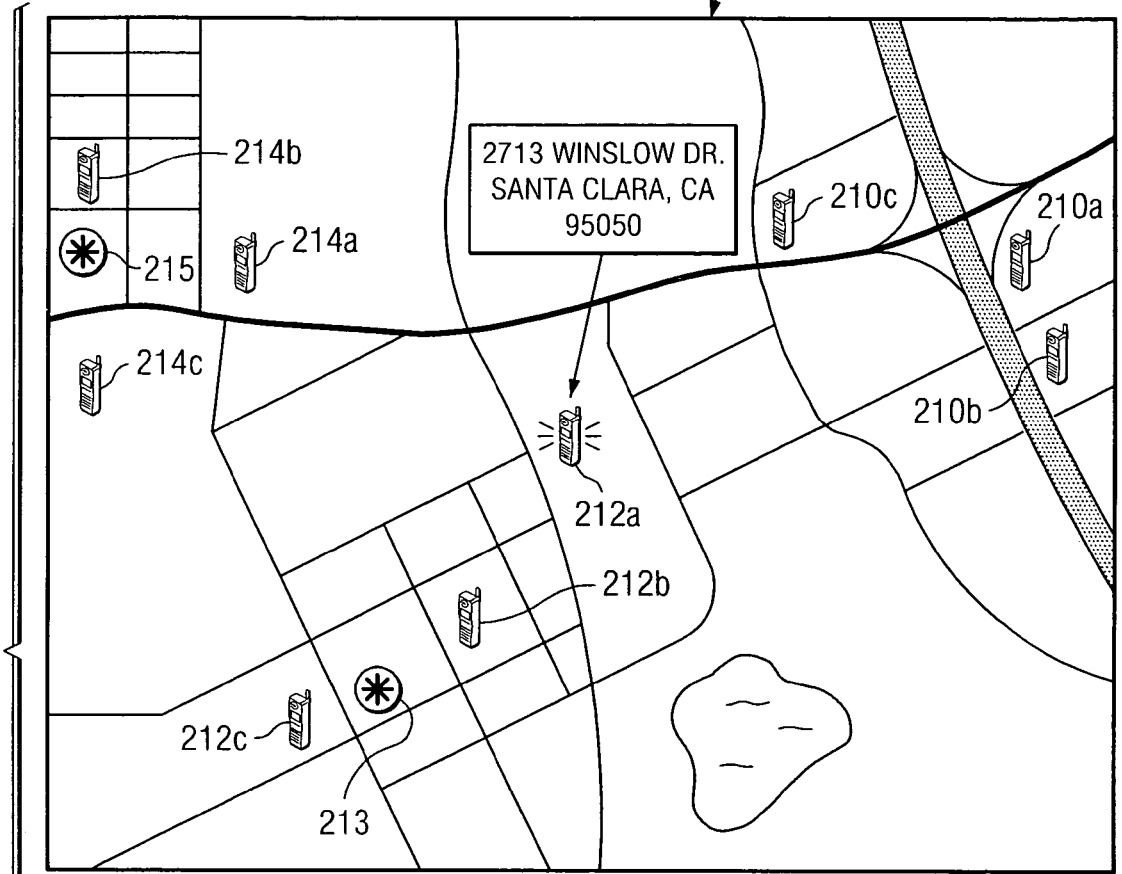
FIG. 4 illustrates an example display used in providing interoperable communications with location information, in accordance with a particular embodiment.

FIG. 4 is an example display 200 of an endpoint, such as PC endpoint 70 or another mobile or non-mobile endpoint, accessing IS 50 through OMA 54, in accordance with a particular embodiment. In the illustrated embodiment, display 200 includes location portion 202 and VTG control portion 204; however, it should be understood that displays of endpoints accessing IS 50 in other embodiments may include additional or different information related to functionality of IS 50 and communications facilitated therethrough.

In this embodiment, location portion 202 displays a particular geographical area showing multiple mobile endpoints 210a-210c, 212a-212c and 214a-214c. VTG control portion 204 shows three virtual talk groups (1, 2 and 3), each comprising a plurality of members. For example, VTG 1 comprises endpoints 210a-210c; VTG 2 comprises endpoints 212a-212c; and VTG 3 comprises endpoints 214a-214c. As discussed above, particular endpoints of various networks (e.g., various public safety agency networks) may be grouped together in virtual talk groups according to any number of factors. In the illustrated embodiment, endpoints 212a, 212b and 212c make up VTG 2 and are associated with incident 213, which may comprise a burglary, fire or other incident. For example, if incident 213 is a fire, a user of endpoint 212a may be a city police officer and endpoint 212a may be part of that city's police department network. A user of endpoint 212b may be fire department personnel responding to the fire, and endpoint 212b may typically communicate on a different fire department network. As also illustrated, endpoints 214a, 214b and 214c form VTG 3 and are associated with incident 215.

As discussed, endpoints of each VTG may be a part of different networks, such as different radio networks of different public or private agencies or groups. For example, with respect to VTG 1, endpoint 210a may be a land mobile radio of a police officer from a particular municipality police network, endpoint 210b may be a land mobile radio of a police officer from a different municipality police network and endpoint 210c may be a cellular phone of a federal agency network. As discussed above, IS 50, through Internet Protocol, enables various endpoints of different networks to communicate in talk groups using the technology of such networks. For example, communications among endpoints 210a-210c may use PTT technology and may be facilitated by IS 50.

A user such as a command officer or dispatch personnel may use display 200 to monitor communications of various channels or talk groups, such as various talk groups composed of land mobile radio or other endpoint users. For example, a command officer may use display 200 to monitor communications on VTGs 1, 2 and 3. Whenever a particular mobile endpoint 210, 212 or 214 user communicates through the endpoint, such as when a user communicates a PTT audio message, the endpoint of display 200 (e.g., PC endpoint 70) may communicate the transmission through the PC endpoint. As indicated above, communications transmitted from a mobile endpoint may comprise audio, video or other data (including PTT messages, IMs, e-mails, streaming video, etc.). Display 200 indicates from which VTG and/or mobile endpoint the communication is transmitted. The communication from the mobile endpoint may also include location information (e.g., GPS information) identifying the location of the mobile endpoint transmitting the message. IS 50 may receive this location information and present to the command officer the location of the mobile endpoint as it communicates the actual message from the endpoint.

For example, assume in the illustrated example that mobile endpoint 212*a* is a police officer's land mobile radio and that its police officer user is communicating an audio message to other members of VTG 2. These other members may include, for example, users of endpoints 212*b* and 212*c* as well as all other users, such as administrative, command or dispatch users, that have access privileges to receive communications of members of this virtual talk group. When transmitting the audio message, endpoint 212*a* also transmits information identifying its location. This message may be communicated through a base station and other components of one or more communication networks and received at IS 50. IS 50 then communicates the message to other endpoints of the talk group (e.g., endpoints 212*b* and 212*c*) if such endpoints are not a part of the same radio network as endpoint 212*a*.In addition, when communicating the audio message from endpoint 212*a*, IS 50 may communicate the location information identifying the location of endpoint 212*a*.Thus, a user of an endpoint presenting display 200 using the endpoint and associated display to monitor communications on VTGs 1, 2 and 3 will know the location of endpoint 212*a* as the user receives communications from the endpoint.

The communication of the particular VTG or endpoint identification of a particular communication as well as the endpoint's location may be performed in any of a variety of ways according to particular operational needs and desires. As an example, in display 200 a particular endpoint transmitting a message communicated to a user of IS 50 may be highlighted or otherwise identified in VTG control portion 204. In addition, the associated VTG number may be highlighted or otherwise identified as well. Moreover, as indicated, as the endpoint of display 200 transmits the audio message from endpoint 212*a,* display 200 may highlight endpoint 212*a* (as illustrated) and may identify the particular endpoint's location, such as identifying a street address location of the endpoint (as illustrated).

The illustrated example shows locations of various endpoints 210, 212 and 214. In some cases, the locations of these endpoints may be updated when a user of the endpoint transmits an audio, video or other message through the endpoint since location information may be transmitted at that time (e.g., embedded within the media stream).

As indicated above, display 200 is only one example of communicating information as described herein, and other embodiments may communicate endpoint location information of communicating endpoints of various networks and talk groups in any suitable manner. Endpoint location information may be transmitted with endpoint communications in any suitable manner, such as through GPRS or steganographically. In particular cases, the communications from mobile endpoints comprise multicast communications that are transmitted to other endpoints of the same network and to IS 50 for transmission to endpoints of other networks. In some embodiments, location information and other meta information, such as unit ID, priority and channel, may be communicated using a separate associated multicast port/channel.

In some cases, location information may be transported in a real-time transport protocol (RTP) header extension. For example, RTP headers include a reserved area in the header to put a variable length header extension that could contain additional information about an RTP talker. As another example, location information may be transported using the real-time control protocol (RTCP) stream. The RTCP port is one higher than the RTP port by definition. In particular cases, other attributes about the endpoint may already be included using RTCP. The location information may comprise, for example, GPS latitude/longitude information or street and/or city information. In some embodiments, the associated RTP stream may include the location information. As an example, 239.1.1.1:21111 might be a RTP multicast address:port through which the voice stream is transported, and another address:port (for example, the RTP VOIP port+2 for the RTP signaling port) may be used to include the location information.

In particular embodiments, the location information may be communicated to all original streams, such as via multipoint conference system 56 of IS 50 or directly between the endpoints without traversing through the IS. For example, GPS1, GPS2 and GPS3 may comprise GPS information from three separate endpoints involved in a talk group. In the case of the appended RTP header example, the multipoint conference system may combine and/or append the meta data components at the point of the mixing or bridging function. In the case of the separate control channel example, the streams may flow to all application aware endpoints, and an endpoint may recognize and determine the interesting or relevant GPS information from multiple meta streams. In the case of the RTCP model example, RTCP streams may be typically collected and terminated at each endpoint. Multipoint conference system 56 may terminate the RTCP meta information and regenerate an associated RTCP stream on the other side for transmission to endpoints of the virtual talk group. In some cases, either the RTP header extension or a new payload type may be used. In particular cases, a description field may be used. In a situation where MCS 56 mixes more than one media stream, the location description field may include the locations of a plurality of speaking endpoints. The RTP header may be sent for every packet and may be large overhead but may be best for real time changing information. The particular data, application and operational requirements and desires may dictate the best methodology for transmission of the location information.

Figure 5:
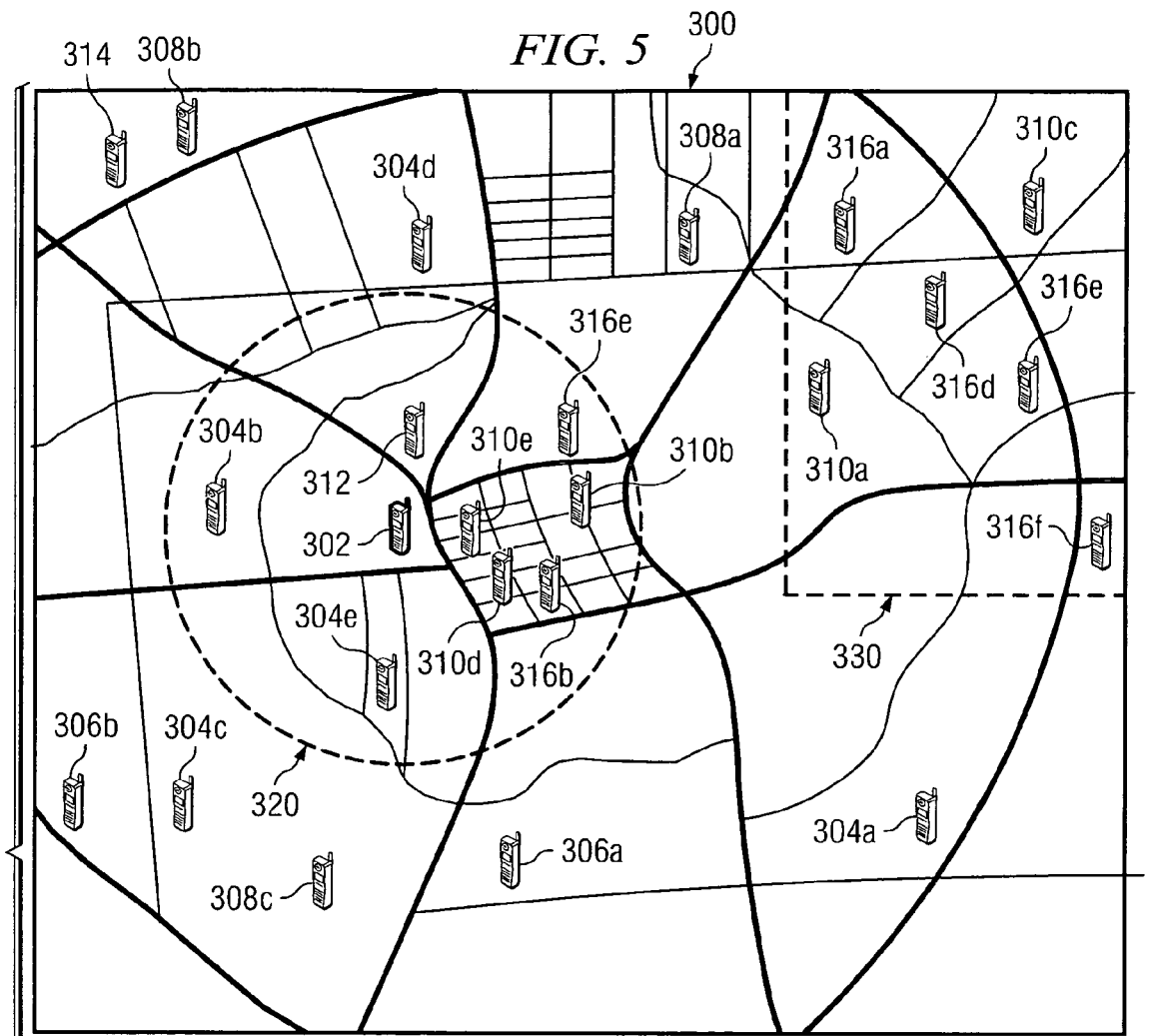
FIG. 5 illustrates an example display used for communicating media based on location of media source, in accordance with a particular embodiment.

FIG. 5 is an example display 300 of an endpoint 302 which may comprise a mobile or non-mobile endpoint, in accordance with a particular embodiment. Display 300 also includes endpoints 304, 306, 308, 310, 312, 314 and 316, which may comprise any type of mobile or non-mobile endpoints of one or more communication networks, such as endpoints and communication networks described above. When transmitting communications, endpoints 304, 306, 308, 310, 312, 314 and 316 may include GPS information identifying their locations in a similar manner as discussed above with respect to FIGS. 3 and 4.

Some of the illustrated endpoints are members of virtual talk groups configured through IS 50. Table 301 lists virtual talk groups 1-5 and current endpoint members of each such VTG. For example, VTG 1 includes endpoints 304*a*-304*e*, VTG 2 includes endpoints 306*a*-306*b,* VTG 3 includes endpoints 308*a*-308*c*, VTG 4 includes endpoints 310*a*-310*e* and VTG 5 includes endpoints 316*a*-316*f.*Currently, endpoints 312 and 314 are not included in any VTG of the IS.

Endpoints 304, 306, 308, 310 and 316 may be assigned a VTG for any operational need, such as geography and/or event or incident. For example, endpoints 316*a*-316*f* may be grouped into a VTG (e.g., VTG 5) to respond to a particular incident. The incident may have occurred, for example, proximate endpoints 316*a*, 316*d*, 316*e* and 316*f.* While endpoints 316*b* and 316*c* are not currently in the immediate vicinity of the incident, it may be desired, for any particular reason, to include those endpoints so that they can participate in the VTG communications.

The endpoints illustrated on display 300 may be part of different communication networks. For example, endpoint 310*a* may be a mobile endpoint of a police department network that communicates on a particular radio frequency, and endpoint 310d may be a mobile endpoint of an ambulance service network that communicates on a different radio frequency. In some cases, endpoints of different communication networks may include endpoints that are communicating on different channels or frequencies (e.g., one endpoint may be communicating on a frequency reserved for police department A while another endpoint may be communicating on a frequency reserved for fire department B). IS 50 facilitates interoperable communications among such endpoints such that communications transmitted by endpoint 310a may be communicated, through one or more base stations or other network components, to endpoint 310d. In addition, IS 50 may convert communications received from these endpoints to IP packets for transmission and receipt by particular IP endpoints which may include, for example, other endpoints 310 of talk group 4 as well as command personnel accessing IS 50 through OMA 54. In some cases, IS 50 may control various gateways to facilitate the conversion of communications to IP packets.

Particular embodiments enable a user to listen, participate or otherwise communicate with particular endpoints or VTGs according to location. As indicated above, endpoint 302 presents display 300 to a user such as a command officer or dispatch personnel. In particular embodiments, such a user may configure endpoint 302 to listen to discussions or otherwise receiving communications in a particular geographical area of display 300. Such area may include any suitable geographical area identified by the user, such as an area within a particular radius of the current location of endpoint 302 or another area that does not include the current location of endpoint 302. For example, in some cases when a user of endpoint 302 desires to listen to activities from a particular site, the user may click on a particular area of the display map presented and/or highlight a specific area of the map and select a "listen" or "participate" function. As a result, IS 50 may automatically configure the user's endpoint to be a part of the VTGs active in this geographical area. The interface through which a user may identify and select a particular area may comprise any suitable interface according to operational needs and desires, such as a mouse, touch screen, key pad or audio command. In particular embodiments, a user may zoom in or out on a particular display to identify and select a geographical area of particular virtual talk groups or endpoints. In some cases, a display may be partitioned into multiple segments or portions for selection by a user.

As an example, a user of endpoint 302 may select a particular distance from endpoint 302 that defines a geographical area 320 so that the user of endpoint may be presented (by his endpoint) with communications from all endpoints included within this area, including VTGs that include endpoints within this area. Thus, in the illustrated embodiment, a user of endpoint 302 could listen to or communicate with endpoints 304b, 304e, 310b, 310d, 310e, 312, 316b and 316c. Endpoint 302 may receive GPS information from endpoints identifying their location to determine whether the endpoints are within area 320 such that their communications should be presented to its user. Endpoint 302 may receive communications from, for example, all endpoints of the display but may filter or otherwise select communications from endpoints within the selected area for presentation to its user. Such presentation may be made through, for example, a speaker, display or other interface. In some embodiments, a policy engine of an IS may store pre-defined areas of interest that are invoked as part of a specific policy.

It should be understood that since endpoints 304b and 304e are part of VTG 1, endpoints 310b, 310d, and 310e are part of VTG 4 and endpoints 316b and 316c are part of VTG 5, in some cases the user of endpoint 302 may be able to communicate with endpoints of VTGs 1, 4 and 5 not included within geographical area 320. For example, assume endpoints 304a and 304b are a part of the same LMR network such that they communicate on the same radio frequency. To allow endpoint 302 to communicate with endpoint 304b (since endpoint 304b is within area 320), IS 50 would have to receive communications from endpoint 302 and transmit the communications to endpoint 304a on the applicable radio frequency that endpoint 304b may also be able to receive.

In particular cases, endpoint 302 may be a mobile endpoint such that when it moves, area 320 moves since area 320 is defined by a particular distance from endpoint 302. For example, if endpoint 302 moves eastward, then endpoint 304b, if stationary, may no longer be within area 320 such that a user of endpoint 302 may no longer be able to communicate with endpoint 304b according to this criteria.

As another example, a user of endpoint 302 may select a geographical area to communicate with that does not include the present location of endpoint 302. For example, a user of endpoint 302 may identify and select area 330. Endpoint 302 may then determine, based on GPS information received, that endpoints 310a and 310c and endpoints 316a, 316d, 316e and 316f are presently within area 330 and may ensure that the user of endpoint 302 is presented communications from such endpoints. In some cases, endpoint 302 may present all communications received by those endpoints within area 330. For example, endpoints 310a and 310c communicate in VTG 4 and may thus receive communications from other members of the VTG, such as endpoints 310b, 310d and 310e. If a user of endpoint 302 is configured to receive communications received by all endpoints within area 330, then the user may also receive communications from, for example, endpoint 310b since VTG 4 communications from this endpoint will be received by endpoint 310a which is within area 330.

In particular embodiments, in response to the selection of a geographical area, a virtual talk group comprising all endpoints currently in that area may be formed. As such endpoints leave the area, they may be removed from the VTG. Similarly, as other endpoints enter the selected area, they may be added to the VTG. In this manner, VTGs may be created based on location of endpoints. In some cases, only certain types of endpoints (e.g., such as only public security agency endpoints) may be added to a VTG defined by endpoints of a particular geographical area.

As discussed above, in particular embodiments a mobile endpoint may filter received communication streams according to the location from which the streams are transmitted. This may be accomplished, for example, when the media streams include the GPS or other location information of the transmitting endpoint. For example, a mobile endpoint such as endpoint 304b may receive all communications from each endpoint in VTG 1. Each such communication may include GPS information identifying the location of the communication's source endpoint. Endpoint 304b may include a processor, similar to that described above with respect to an IS, that filters out for communication to a user of endpoint 304b only those communications received from endpoints in a selected or predefined geographical area. Such geographical area may be selected and/or predefined by a user of endpoint 304b in a similar manners as in other embodiments described above with respect to endpoint 302. Thus, even though the endpoint may receive communications from various locations, the endpoint may examine the GPS information in such communications to play or otherwise present to its user only those communications coming from a particular location, region or area. While some embodiments discussed above discuss location information or GPS information filter functionality at an endpoint, it should be understood that this filter functionality may be performed at an IS and selected or filtered communications may then be transmitted to a user's endpoint for presentation to the user.

Figure 6:
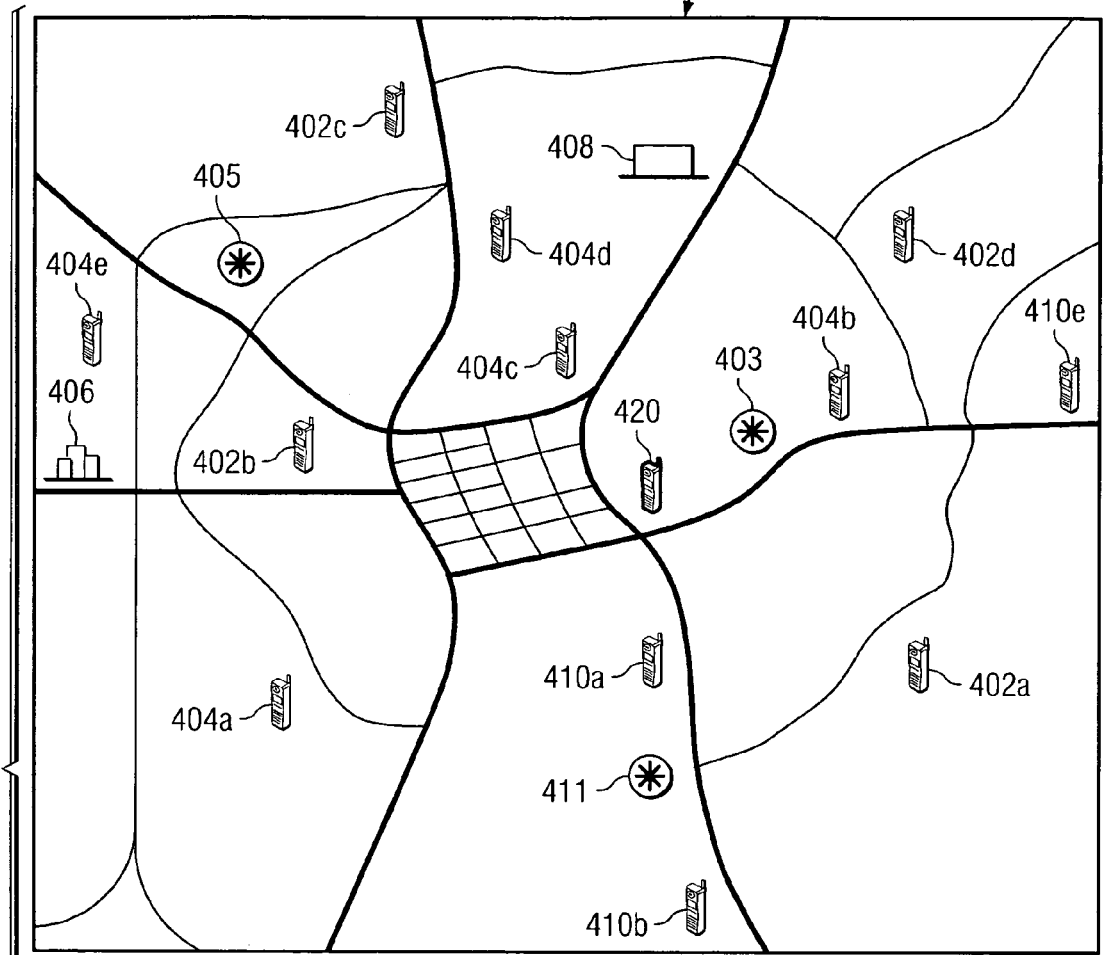
FIG. 6 illustrates an example display used in providing interoperable communications according to scene-related virtual talk groups, in accordance with a particular embodiment.

FIG. 6 is an example display 400 of an endpoint 420 which may comprise a mobile or non-mobile endpoint accessing IS 50 through OMA 54, in accordance with a particular embodiment. Display 400 also shows endpoints 402a-402d, 404a-404e, and 410a-410c, which may comprise any type of mobile or non-mobile endpoints of one or more communication networks, such as endpoints and communication networks described above. In addition, display 400 shows hospital network 406 and police station network 408 which each include one or more endpoints at the hospital and police station, respectively. When transmitting communications, the illustrated endpoints may include GPS information identifying their locations in a similar manner as discussed above.

Illustrated endpoints are members of virtual talk groups configured through IS 50. Table 401 lists virtual talk groups 1-4 and current endpoint members of each such VTG. For example, VTG 1 includes endpoints 402a-402d and hospital 406, VTG 2 includes endpoints 404a-404e and police station 408, VTG 3 includes endpoints 410a-410c and VTG 4 includes hospital 406. As discussed above, endpoints in particular embodiments may be assigned a VTG for any operational need, such as geography, scene or event or incident. As used herein, the terms scene, event or incident can be used interchangeably to describe one another. For example, a scene may include an event or incident. In this example, VTG 1 is associated with a scene 403, VTG 2 is associated with a scene 405, VTG 3 is associated with a scene 411 and VTG 4 is associated with hospital scene 406 which, as discussed above, includes one or more hospital endpoints. The endpoints illustrated on display 400, including hospital 406 and police station 408, may be part of different communication networks. Such different communication networks may include different LMR networks, LANs, cellular networks or any other type of communication network as discussed herein.

In particular embodiments, a user's endpoint may be configured to listen, participate or otherwise communicate with particular endpoints or VTGs according to scene, incident or event. As indicated above, endpoint 420 presents display 400 to a user such as a command officer or dispatch personnel. In particular embodiments, such a user may configure endpoint 420 to listen to discussions or otherwise receive communications according to a particular scene using any suitable criteria or instructions. Configuration instructions may be received by an interface of IS 50 from a user through an endpoint interface or from a system operator, administrator or other personnel. In some cases, a user's endpoint may be preconfigured to listen to particular scene-related VTGs according to any suitable set of preconfiguration instructions.

As an example, assume that a user of endpoint 420 is a police command officer currently communicating on VTG 1 associated with a car accident scene 403. VTG 1 includes endpoints 402a-402d and hospital 406. Assume that scene 405 comprises a burglary and that the police command officer using endpoint needs to drive to the burglary scene. As indicated above, VTG 2 is associated with scene 405 and includes endpoints 404a-404e and police station 408. In particular embodiments, endpoint 420 is configured to automatically switch to VTG 2 of burglary scene 405 as endpoint 420 gets close to the scene. In some cases, endpoint 420 may switch to one or more VTGs of the closest scene to endpoint 420. For example, when endpoint 420 becomes closer to scene 405 than scene 403, the endpoint may switch to VTG 2. Similarly, if endpoint 420 was closest to scene 411, it would switch to VTG 3.

As another example, assume that a user of endpoint 420 is an ambulance driver at car accident scene 403. Endpoint 420 may thus be patched into VTG 1 associated with scene 403. The ambulance driver may need to take a victim of the accident to hospital 406. As indicated above, endpoints of hospital 406 may also be a part of another group, VTG 4, associated with the hospital. As endpoint 420 gets closer to hospital 406, the endpoint may be configured to automatically switch to VTG 4. This may be done because the driver may no longer need to speak with members of VTG 1 since he has left scene 403. Switching to VTG 4 which just includes hospital endpoints 406 may reduce unnecessary information flow to the ambulance driver and help him focus on delivering the patient promptly to the hospital. By removing communications from VTG members at the scene of the accident, overflow of irrelevant information to the driver is reduced and the driver is allowed to focus on hospital-specific information.

Instead of switching to a VTG associated with a closest scene, in some cases an endpoint 420 may be configured to switch to one or more VTGs of scenes within a particular distance of the endpoint. Thus, the endpoint may receive communications from a plurality of VTGs associated with a plurality of scenes. GPS information received by endpoint 302 may be used by IS 50 to determine the location of endpoint 302 and therefore the proper VTG(s) in which endpoint 302 would participate based on suitable instructions.

Endpoints may be configured to switch to VTGs of particular scenes according to any suitable criteria or instructions. In some cases, endpoint 302 may be configured to switch to all VTGs associated with scenes, events or incidents of a particular priority level. For example, if scenes 403, 405 and 411 comprised a hostage crisis, an armed robbery and a car accident, respectively, scenes 403 and 405 may be assigned a higher priority than scene 411. As such, endpoint 420 may be configured to automatically participate in VTGs 1 and 2 (associated with scenes 403 and 405). Various priority levels may be assigned to scenes in accordance with particular needs. In addition, endpoint 420 may automatically switch to various VTGs dynamically as scenes, events and incidents occur in a similar manner as the switching of endpoint 420 to VTGs based on location.

As another example, in some cases endpoint 420 may be configured to switch to all VTGs associated with scenes, events or incidents of a particular type. For example, VTGs may exist for various types of incidents, such as police incidents, fire incidents, rescue incidents, federal incidents, investigation incidents and private organization incidents. In some cases, endpoint 302 may be configured to listen to all police incidents as they arise. In some cases, endpoint 420 may be configured to listen to all burglary scenes or all hostage scenes or all fire scenes or all car accidents as they arise. In other cases, a user of endpoint 420 may comprise a company security officer whose endpoint 420 automatically listens to all VTGs associated with security-related incidents. In some embodiments, the selection of scenes (e.g., by priority, type or other characteristic) may be combined with a particular geographical area. For example, endpoint 420 may be configured to listen to all high priority scenes in a particular geographic area or all car accident scenes in a particular area. Particular embodiments may enable an endpoint to be configured to listen to and/or communication with any of a variety of event, incident or scene-specific virtual talk groups according to any of a variety of factors, characteristics, or criteria. For example, a chief of police of Washington, D.C. may always be tuned into any communication originating from the vicinity of the White House.

As indicated above, endpoints whose communications are facilitated by an IS may include PTT endpoints. Since PTT endpoints are typically half duplex devices, one must "control the floor" in order to talk to other endpoints in a talk group. Particular embodiments may selectively provide floor control to an endpoint requesting to talk based on the distance of the endpoint to an incident or scene associated with a virtual talk group, particularly if more than one PTT endpoints is requesting to talk at the same time. For example, an IS may give floor control to the endpoint requesting to talk that is closest to an event associated with a VTG of which the endpoints requesting to talk are members. As is the case in other embodiments, the IS may analyze location information transmitted in communications or in the actual talk request control signal from the endpoints.

It will be recognized by those of ordinary skill in the art that endpoints and interoperability systems disclosed herein are merely example configurations in accordance with particular embodiments. These systems may include any number of interfaces, processors, memory modules, and other components to accomplish the functionality and features described herein. In addition, these components and other desired components for performing the above described functionality may be centrally located (local) with respect to one another, or distributed throughout communication systems and networks. In addition, one or more components of these systems and devices may work together in performing various functionality described herein.

Figure 7:
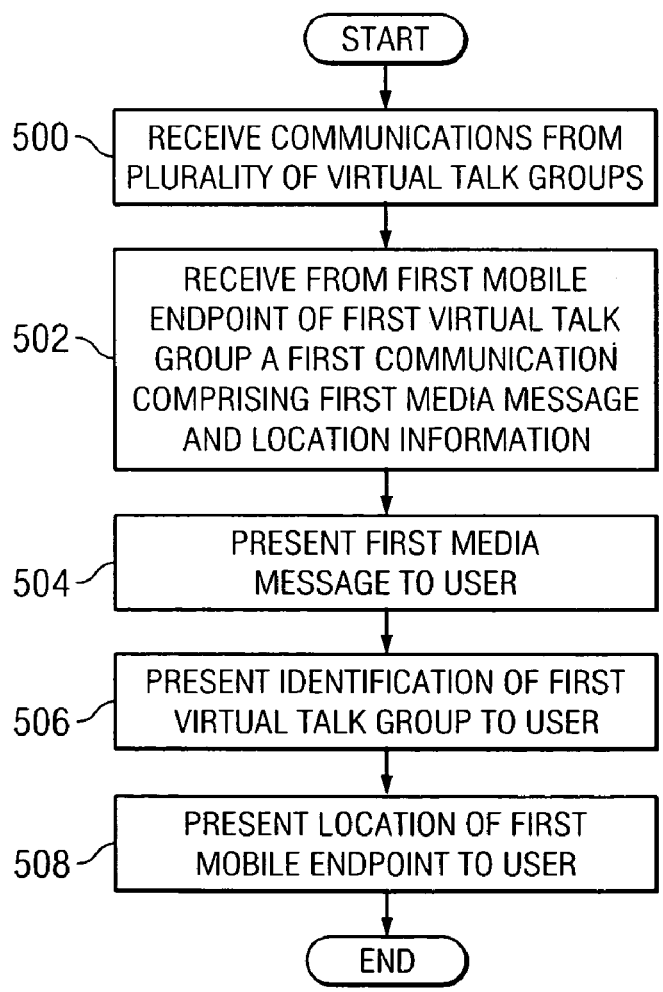
FIG. 7 illustrates a method for providing interoperable communications with location information, in accordance with a particular embodiment.

FIG. 7 is a flowchart illustrating a method for providing interoperable communications with location information, in accordance with a particular embodiment. The method begins at step 500 where communications from a plurality of virtual talk groups are received. The virtual talk groups may each comprise a plurality of endpoints of different communication networks. It should be understood that for purposes of the descriptions and claims herein, whenever a VTG is described as comprising a plurality of endpoints of different communication networks, in addition to including at least some endpoints of different communication networks, the VTG may also include some endpoints of the same communication network. For example, the VTG may include a plurality of endpoints of the same police department network in addition to one or more endpoints of other communication networks, such as other police or fire department or private company networks. Moreover, in some cases, endpoints of different communication networks may include endpoints that are communicating on different channels or frequencies. The different communication networks may comprise networks of different technologies, such as IP, cellular, PSTN, LMR, CDMA, GSM, TDMA, GPRS and satellite. In particular embodiments, at least some of the endpoints of the virtual talk groups may communicate through PTT technology. In addition, some of the endpoints may comprise IP endpoints. Moreover, the different communication networks may comprise networks of various safety and security agencies, whether public or private as well as networks of public and private groups, companies or organizations. The communications may be received at an interoperability system and/or at a client application of an interoperability system.

The communications may be received via a multicast stream whose header includes the location information or via a unicast stream with the location information. The virtual talk groups may include communications (from the various endpoints) that are facilitated by an IS by mapping the communications to a multicast IP address or by bridging the communications at a multipoint conference system of the IS.

At step 502, a first communication is received from a first mobile endpoint of a first virtual talk group of the plurality of virtual talk groups. The first communication comprises a first media message and location information identifying a location of the first mobile endpoint. The location information may comprise GPS information. The message may comprise an audio, video, IM or other data message from the first endpoint, such as a push-to-talk communication from a land mobile radio.

At step 504, the first media message is presented to a user. At step 506, an identification of the first virtual talk group may be presented to the user. At step 508, the location of the first mobile endpoint is presented to the user. The user may be receiving communication from endpoints of the monitored plurality of virtual talk groups, for example, through a PC, IP phone or other endpoint running a client application that accesses an IS. As the first message from the first mobile endpoint is presented to the user, an identification of the first virtual talk group of which the first mobile endpoint is a member may be transmitted to the user by an IS. This may aid a user who is presented information from multiple virtual talk groups to determine from which virtual talk group the first communication is transmitted. In addition, the location of the first mobile endpoint may be presented to the user by the IS. Such presentation of the first virtual talk group identification and location of the first mobile endpoint may be through a display of an endpoint through which the user accesses the IS using any suitable presentation method. In some embodiments, the location of the first mobile endpoint may be presented as a geographical address, such as a street address or longitude and latitude or other coordinate address.

FIG. 8 is a flowchart illustrating a method for communicating media based on location of media source, in accordance with a particular embodiment. The method begins at step 600 where communications comprising a media message and location information are received from a plurality of endpoints. The communications may be received at a user's mobile endpoint. In some cases an IS may facilitate the transmittal of the communications to the endpoint, such as by controlling LMR gateways or other components, by mapping communications to a multicast IP address, by bridging communications into a mixed stream or by other methods. In some cases the communications may be received from endpoints of different virtual talk groups. The communications may be received via multicast streams or nailed dialed connections, such as those using SIP protocol. In particular embodiments, at least some of the transmitting endpoints may communicate through PTT technology. In addition, some of the endpoints may comprise IP endpoints. The location information identifies a location of the endpoint communicating the message and may comprise GPS information.

At step 602, a selection of a geographical area is received from a user. The user may be a command officer or other user utilizing a mobile endpoint. The selection of a geographical area may be received by the user, for example, selecting the area on a display of his endpoint such as by drawing the area on a map shown on a touch screen display.

At step 604, location information of each communication is compared with the selected geographical area. Such comparison may be performed at the user's mobile endpoint. As indicated above, the location information identifies a location of the endpoint transmitting the communication. At step 606, the endpoint determines whether the location information of each transmitting endpoint is within the selected geographic area. For each endpoint whose location information indicates that the transmitting endpoint is not in the selected geographic area, the method ends. However, the method may continue to check whether other endpoints move into the selected geographic area or whether endpoints not in the area come to be within the area as a result of the area moving.

At step 608, for each transmitting endpoint whose location information indicates that the endpoint is within the selected geographic area, each message from each such endpoint is presented to the user by, for example, the user's endpoint. These messages may be communicated to the user through a display, speaker or other audio interface. The messages may comprise push-to-talk messages received from LMR endpoints within the selected geographic area. In particular embodiments, communications from the plurality of endpoints may be presented to the user as long as the various endpoints are within the geographical area. In addition, as other endpoints enter the selected geographical area, their communications may be presented to the user as well. Thus, some embodiments may send an audio stream to a user that mixes communications from all endpoints currently within an area, and the mixed stream may account for and dynamically include (and exclude) communications from endpoints as they enter and leave the area.

FIG. 9 is a flowchart illustrating a method for automatic configuration of virtual talk groups based on location of media source, in accordance with a particular embodiment. The method begins at step 700 where communications from a plurality of endpoints are monitored, such as at an interoperability system. Each communication may comprise a media message and location information identifying a location of its transmitting endpoint. At step 702, virtual talk group configuration instructions based on the locations of the mobile endpoints are received. In some cases virtual talk group configuration instructions may be received from a user accessing an OMA 54 of an IS through an IS client application. In some cases virtual talk group configuration instructions may be pre-loaded or pre-configured on the IS.

The virtual talk group configuration instructions may include, for example, instructions to configure a virtual talk group of mobile endpoints within a first distance of an event (e.g., a car accident, burglary, terrorist or other event), within a first distance of a particular user's mobile endpoint (e.g., such as a user accessing an IS through a client application) or within a geographic area selected on a map by a user. Virtual talk group instructions based on locations of mobile endpoints may include instructions to configure the virtual talk group based on any of a variety of suitable or desired operational factors or characteristics.

At step 704, a first group of mobile endpoints is selected according to the virtual talk group configuration instructions. For example, if the virtual talk group configuration instructions include instructions to configure a virtual talk group of all mobile endpoints within a particular distance of an event, then all such endpoint may be selected at step 704. At step 706, a first virtual talk group comprising the selected first group of mobile endpoints is configured to facilitate communications among the selected first group of mobile endpoints. The selected first group of mobile endpoints may include mobile endpoints of different communication networks. The communications among members of the virtual talk group may be facilitated by an IS by, for example, controlling LMR and other gateways coupling various types of communication networks. In some cases the communications may be mapped to one or more multicast IP addresses to enable the virtual talk group. In some cases communications from the various endpoints may be bridged by a multipoint conference system into a communication stream for transmission to endpoints of the virtual talk group.

As in other embodiments, a virtual talk group may comprise endpoints utilizing different technologies. In particular embodiments, at least some of the endpoints may communicate through PTT technology. In addition, some of the endpoints may comprise IP endpoints. Moreover, the different communication networks may comprise networks of various safety and security agencies, whether public or private as well as networks of public and private groups, companies or organizations.

Some of the steps illustrated in FIGS. 7, 8 and 9 may be combined, modified or deleted where appropriate, and additional steps may also be added to the flowcharts. Additionally, steps may be performed in any suitable order without departing from the scope of the invention.

While various implementations and features are discussed with respect to multiple embodiments, it should be understood that such implementations and features may be combined in various embodiments. For example, features and functionality discussed with respect to a particular figure such as one of FIGS. 4-9 may be used in connection with features and functionality discussed with respect to another such figure according to operational needs or desires.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and illustrated endpoints and interoperability systems, these elements may be combined, rearranged or positioned in order to accommodate particular routing architectures or needs. In addition, any of these elements may be provided as separate external components to communication system 10 and illustrated endpoints and interoperability systems, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for automatic configuration of virtual talk groups based on location of media source, comprising:
monitoring communications from a plurality of mobile endpoints, each communication comprising a media message and location information identifying a location of its transmitting endpoint;
selecting a first group of mobile endpoints of the plurality of endpoints according to virtual talk group configuration instructions based on the locations of the mobile endpoints;
configuring a first virtual talk group comprising the first group of mobile endpoints to facilitate communications among the first group of mobile endpoints, the first group of mobile endpoints comprising mobile endpoints of different communication networks;
wherein the first group of mobile endpoints of the first virtual talk group comprise a plurality of mobile endpoints of different communication networks whose communications are mapped to a multicast IP address;
wherein the first virtual talk group is associated with a geographical area;
further comprising determining whether each of the selected first group of mobile endpoints are within a multicast reach of the geographical area; and
wherein configuring the first virtual talk group comprises joining in the first virtual talk group via multicast each of the selected first group of mobile endpoints that are within the multicast reach of the geographical area.

2. The method of claim 1, wherein the virtual talk group configuration instructions include instructions to configure a virtual talk group of mobile endpoints within a first distance of a first event.

3. The method of claim 1, wherein the virtual talk group configuration instructions include instructions to configure a virtual talk group of mobile endpoints within a first distance of a mobile endpoint of a user.

4. The method of claim 1, wherein the virtual talk group configuration instructions include instructions to configure a virtual talk group of mobile endpoints within a selected geographic area.

5. The method of claim 4, wherein the geographic area is selected on a map by a user.

6. The method of claim 1, further comprising:
receiving the virtual talk group configuration instructions from a user; and
adding a mobile endpoint of the user to the first virtual talk group such that communications from the first group of mobile endpoints are communicated to the user.

7. The method of claim 1, further comprising removing a first mobile endpoint of the first group of mobile endpoints from the first virtual talk group when the first mobile endpoint leaves a geographic area associated with the first virtual talk group.

8. The method of claim 1:
wherein the virtual talk group configuration instructions relate to a first geographical area and the first virtual talk group is configured based on mobile endpoints within the first geographical area; and
further comprising removing a first mobile endpoint of the first group of mobile endpoints from the first virtual talk group when the first mobile endpoint leaves a second geographical area, the second geographical area including and greater than the first geographical area.

9. The method of claim 1, wherein the first group of mobile endpoints of the first virtual talk group comprise a plurality of mobile endpoints of different communication networks whose communications are bridged.

10. The method of claim 1, wherein the first group of mobile endpoints of the first virtual talk group comprises land mobile radios operable to communicate on different frequencies.

11. The method of claim 1, wherein communications from the plurality of mobile endpoints comprises push-to-talk communications.

12. The method of claim 1, wherein the different communication networks comprise at least two of: a police department communication network, a fire department communication network, an ambulance communication network and a company communication network.

13. The method of claim 1, wherein configuring the first virtual talk group comprises joining in the first virtual talk group via nailed dialed connections each of the selected first group of mobile endpoints that are not within the multicast reach of the geographical area.

14. The method of claim 13, wherein the joining via nailed dialed connections comprises joining using SIP protocol.

15. The method of claim 1:
further comprising switching a the-first mobile endpoint of the first group of mobile endpoints to a nailed SIP connection to the first virtual talk group when the first mobile endpoint leaves the multicast reach of the geographical area.

16. The method of claim 1, further comprising:
determining that a first mobile endpoint of the first group of mobile endpoints is continuously moving in and out of the a-multicast reach of the geographical area; and
in response to the determination that the first mobile endpoint is continuously moving in and out of the multicast reach, providing a connection for the first mobile endpoint to the first virtual talk group via a nailed dialed connection.

17. A system for automatic configuration of virtual talk groups based on location of media source, comprising a processor operable to:
monitor communications from a plurality of mobile endpoints, each communication comprising a media message and location information identifying a location of its transmitting endpoint;
select a first group of mobile endpoints of the plurality of endpoints according to virtual talk group configuration instructions based on the locations of the mobile endpoints;
configure a first virtual talk group comprising the first group of mobile endpoints to facilitate communications among the first group of mobile endpoints, the first group of mobile endpoints comprising mobile endpoints of different communication networks;
wherein the first group of mobile endpoints of the first virtual talk group comprise a plurality of mobile endpoints of different communication networks whose communications are mapped to a multicast IP address;
the first virtual talk group is associated with a geographical area
the processor is further operable to determine whether each of the selected first group of mobile endpoints are within a multicast reach of the geographical area; and
a processor operable to configure the first virtual talk group comprises a processor operable to join in the first virtual talk group via multicast each of the selected first group of mobile endpoints that are within the multicast reach of the geographical area.

18. The system of claim 17, wherein the virtual talk group configuration instructions include instructions to configure a virtual talk group of mobile endpoints within a first distance of a first event.

19. The system of claim 17, wherein the virtual talk group configuration instructions include instructions to configure a virtual talk group of mobile endpoints within a first distance of a mobile endpoint of a user.

20. The system of claim 19, wherein the virtual talk group configuration instructions include instructions to configure a virtual talk group of mobile endpoints within a selected geographic area.

21. The system of claim 20, wherein the geographic area is selected on a map by a user.

22. The system of claim 17:
an interface coupled to the processor and operable to receive the virtual talk group configuration instructions from a user; and
wherein the processor is further operable to add a mobile endpoint of the user to the first virtual talk group such that communications from the first group of mobile endpoints are communicated to the user.

23. The system of claim 17, wherein the processor is further operable to remove a first mobile endpoint of the first group of mobile endpoints from the first virtual talk group when the first mobile endpoint leaves a geographic area associated with the first virtual talk group.

24. The system of claim 17, wherein:
the virtual talk group configuration instructions relate to a first geographical area and the first virtual talk group is configured based on mobile endpoints within the first geographical area; and
the processor is further operable to remove a first mobile endpoint of the first group of mobile endpoints from the first virtual talk group when the first mobile endpoint leaves a second geographical area, the second geographical area including and greater than the first geographical area.

25. The system of claim 17, wherein the first group of mobile endpoints of the first virtual talk group comprise a plurality of mobile endpoints of different communication networks whose communications are bridged.

26. The system of claim 17, wherein the first group of mobile endpoints of the first virtual talk group comprises land mobile radios operable to communicate on different frequencies.

27. The system of claim 17, wherein communications from the plurality of mobile endpoints comprises push-to-talk communications.

28. The system of claim 17, wherein the different communication networks comprise at least two of: a police department communication network, a fire department communication network, an ambulance communication network and a company communication network.

29. The system of claim 17, wherein a processor operable to configure the first virtual talk group comprises a processor operable to join in the first virtual talk group via nailed dialed connections each of the selected first group of mobile endpoints that are not within the multicast reach of the geographical area.

30. The system of claim 29, wherein the joining via nailed dialed connections comprises joining using SIP protocol.

31. The system of claim 17, wherein:
the processor is further operable to switch a first mobile endpoint of the first group of mobile endpoints to a nailed SIP connection to the first virtual talk group when the first mobile endpoint leaves the multicast reach of the geographical area.

32. The system of claim 17, wherein:
the processor is further operable to:
determine that a first mobile endpoint of the first group of mobile endpoints is continuously moving in and out of the multicast reach of the geographical area; and
in response to the determination that the first mobile endpoint is continuously moving in and out of the multicast reach, provide a connection for the first mobile endpoint to the first virtual talk group via a nailed dialed connection.

33. A system for automatic configuration of virtual talk groups based on location of media source, comprising:
means for monitoring communications from a plurality of mobile endpoints, each communication comprising a media message and location information identifying a location of its transmitting endpoint;
means for selecting a first group of mobile endpoints of the plurality of endpoints according to virtual talk group configuration instructions based on the locations of the mobile endpoints;
means for configuring a first virtual talk group comprising the first group of mobile endpoints to facilitate communications among the first group of mobile endpoints, the first group of mobile endpoints comprising mobile endpoints of different communication networks;
wherein the first group of mobile endpoints of the first virtual talk group comprise a plurality of mobile endpoints of different communication networks whose communications are mapped to a multicast IP address;
wherein the first virtual talk group is associated with a geographical area;
further comprising means for determining whether each of the selected first group of mobile endpoints are within a multicast reach of the geographical area: and
wherein means for configuring the first virtual talk group comprises means for joining in the first virtual talk group via multicast each of the selected first group of mobile endpoints that are within the multicast reach of the geographical area.

34. Logic embodied in a tangible computer readable medium, the computer readable medium comprising executable code operable to:
monitor communications from a plurality of mobile endpoints, each communication comprising a media message and location information identifying a location of its transmitting endpoint;
select a first group of mobile endpoints of the plurality of endpoints according to virtual talk group configuration instructions based on the locations of the mobile endpoints;
configure a first virtual talk group comprising the first group of mobile endpoints to facilitate communications among the first group of mobile endpoints, the first group of mobile endpoints comprising mobile endpoints of different communication networks;
wherein the first group of mobile endpoints of the first virtual talk group comprise a plurality of mobile endpoints of different communication networks whose communications are mapped to a multicast IP address;
wherein the first virtual talk group is associated with a geographical area;
wherein the code is further operable to determine whether each of the selected first group of mobile endpoints are within a multicast reach of the geographical area; and
wherein code operable to configure the first virtual talk group comprises code operable to join in the first virtual talk group via multicast each of the selected first group of mobile endpoints that are within the multicast reach of the geographical area.

35. A method for automatic configuration of virtual talk groups based on location of media source, comprising:
monitoring communications from a plurality of mobile endpoints, each communication comprising a media message and location information identifying a location of its transmitting endpoint;
selecting a first group of mobile endpoints of the plurality of endpoints according to virtual talk group configuration instructions based on the locations of the mobile endpoints;
configuring a first virtual talk group comprising the first group of mobile endpoints to facilitate communications among the first group of mobile endpoints, the first group of mobile endpoints comprising mobile endpoints of different communication networks;
wherein the first group of mobile endpoints of the first virtual talk group comprise a plurality of mobile endpoints of different communication networks whose communications are mapped to a multicast IP address;
wherein the virtual talk group configuration instructions relate to a first geographical area and the first virtual talk group is configured based on mobile endpoints within the first geographical area; and
further comprising removing a first mobile endpoint of the first group of mobile endpoints from the first virtual talk group when the first mobile endpoint leaves a second geographical area, the second geographical area including and greater than the first geographical area.

36. A system for automatic configuration of virtual talk groups based on location of media source, comprising a processor operable to:
monitor communications from a plurality of mobile endpoints, each communication comprising a media message and location information identifying a location of its transmitting endpoint;

select a first group of mobile endpoints of the plurality of endpoints according to virtual talk group configuration instructions based on the locations of the mobile endpoints;

configure a first virtual talk group comprising the first group of mobile endpoints to facilitate communications among the first group of mobile endpoints, the first group of mobile endpoints comprising mobile endpoints of different communication networks;

wherein the first group of mobile endpoints of the first virtual talk group comprise a plurality of mobile endpoints of different communication networks whose communications are mapped to a multicast IP address;

wherein the virtual talk group configuration instructions relate to a first geographical area and the first virtual talk group is configured based on mobile endpoints within the first geographical area; and wherein the processor is further operable to remove a first mobile endpoint of the first group of mobile endpoints from the first virtual talk group when the first mobile endpoint leaves a second geographical area, the second geographical area including and greater than the first geographical area.

37. A system for automatic configuration of virtual talk groups based on location of media source, comprising:

means for monitoring communications from a plurality of mobile endpoints, each communication comprising a media message and location information identifying a location of its transmitting endpoint;

means for selecting a first group of mobile endpoints of the plurality of endpoints according to virtual talk group configuration instructions based on the locations of the mobile endpoints;

means for configuring a first virtual talk group comprising the first group of mobile endpoints to facilitate communications among the first group of mobile endpoints, the first group of mobile endpoints comprising mobile endpoints of different communication networks;

wherein the first group of mobile endpoints of the first virtual talk group comprise a plurality of mobile endpoints of different communication networks whose communications are mapped to a multicast IP address;

wherein the virtual talk group configuration instructions relate to a first geographical area and the first virtual talk group is configured based on mobile endpoints within the first geographical area; and further comprising means for removing a first mobile endpoint of the first group of mobile endpoints from the first virtual talk group when the first mobile endpoint leaves a second geographical area, the second geographical area including and greater than the first geographical area.

38. Logic embodied in a tangible computer readable medium, the computer readable medium comprising executable code operable to:

monitor communications from a plurality of mobile endpoints, each communication comprising a media message and location information identifying a location of its transmitting endpoint;

select a first group of mobile endpoints of the plurality of endpoints according to virtual talk group configuration instructions based on the locations of the mobile endpoints;

configure a first virtual talk group comprising the first group of mobile endpoints to facilitate communications among the first group of mobile endpoints, the first group of mobile endpoints comprising mobile endpoints of different communication networks;

wherein the first group of mobile endpoints of the first virtual talk group comprise a plurality of mobile endpoints of different communication networks whose communications are mapped to a multicast IP address;

wherein the virtual talk group configuration instructions relate to a first geographical area and the first virtual talk group is configured based on mobile endpoints within the first geographical area; and wherein the code is further operable to remove a first mobile endpoint of the first group of mobile endpoints from the first virtual talk group when the first mobile endpoint leaves a second geographical area, the second geographical area including and greater than the first geographical area.

* * * * *